United States Patent
Kashiwagi et al.

(10) Patent No.: US 8,150,442 B2
(45) Date of Patent: Apr. 3, 2012

(54) METHOD AND APPARATUS FOR CONTROLLING POWER OF SUBCARRIERS IN A WIRELESS COMMUNICATION SYSTEM

(75) Inventors: Hiroki Kashiwagi, Chiba (JP); Yasuhiro Hamaguchi, Ichihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1048 days.

(21) Appl. No.: 11/795,408

(22) PCT Filed: Dec. 2, 2005

(86) PCT No.: PCT/JP2005/022212
§ 371 (c)(1),
(2), (4) Date: Jul. 17, 2007

(87) PCT Pub. No.: WO2006/077696
PCT Pub. Date: Jul. 27, 2006

(65) Prior Publication Data
US 2008/0130615 A1   Jun. 5, 2008

(30) Foreign Application Priority Data
Jan. 18, 2005  (JP) ................................. 2005-010252

(51) Int. Cl.
  H04B 7/00    (2006.01)
  H04B 7/208   (2006.01)
  H04W 72/00   (2009.01)
  H04W 4/00    (2009.01)
  H04J 1/00    (2006.01)
(52) U.S. Cl. ........ 455/522; 455/450; 455/509; 370/328; 370/341; 370/343; 370/344
(58) Field of Classification Search .................. 370/310, 370/328–330, 332, 338, 341, 343–345, 349–350; 455/45, 62, 63.1, 67.11, 418, 420, 450, 509, 455/513, 517, 526, 550.1, 556.2, 561, 60, 455/452.1, 500, 522; 348/486–487
See application file for complete search history.

(56) References Cited

U.S. PATENT DOCUMENTS
6,160,791 A * 12/2000 Bohnke .................... 370/208
(Continued)

FOREIGN PATENT DOCUMENTS
EP     0 899 923 A1 *  3/1999
(Continued)

OTHER PUBLICATIONS

Koshimizu et al;, "A Study on Interference Estimation Method for Adaptive modulation of Downlink DPC-OF/TDMA," Technical Report of the IEICE RCS2004-85 (Jun. 2004), pp. 55-60.

(Continued)

*Primary Examiner* — Meless Zewdu
(74) *Attorney, Agent, or Firm* — Kilpatrick Townsend & Stockton LLP

(57) ABSTRACT

[Object] To implement wireless communication also with a communicating apparatus that is a limited band terminal capable of receiving only part of frequencies.
[Overcoming Means] Provided are a frequency channel allocating section (10) that allocates frequency channels, a terminal reception quality information processing section (6) that calculates an optimal modulation rate and required transmit power for each subcarrier, a subcarrier power control section (12) that controls a level of transmit power for each subcarrier, and a determining section (10) that checks a reception bandwidth of a communicating apparatus, while determining whether the communicating apparatus is a full band terminal capable of receiving all the frequency channels in the system band or is a limited band terminal capable of receiving only part of frequencies, and when the communicating apparatus is the limited band terminal, the transmit power of all or part of subcarriers is decreased in a frequency channel that is adjacent to a reception band allocated to the communicating apparatus and that is allocated to another communicating apparatus.

8 Claims, 22 Drawing Sheets

U.S. PATENT DOCUMENTS

| | | | |
|---|---|---|---|
| 6,230,022 B1 | 5/2001 | Sakoda et al. | |
| 6,747,945 B2* | 6/2004 | Sudo et al. | 370/203 |
| 6,823,187 B2 | 11/2004 | Hamabe et al. | |
| 6,928,062 B2 | 8/2005 | Krishnan et al. | |
| 7,633,924 B2* | 12/2009 | Fujii et al. | 370/343 |
| 7,640,373 B2 | 12/2009 | Cudak et al. | |
| 7,817,729 B2 | 10/2010 | Miyoshi et al. | |
| 7,826,435 B1* | 11/2010 | Wu et al. | 370/342 |
| 2001/0016499 A1 | 8/2001 | Hamabe | |
| 2002/0114270 A1* | 8/2002 | Pierzga et al. | 370/208 |
| 2002/0196734 A1 | 12/2002 | Tanaka et al. | |
| 2004/0009782 A1* | 1/2004 | Shimizu | 455/522 |
| 2004/0081123 A1 | 4/2004 | Krishnan et al. | |
| 2004/0203442 A1 | 10/2004 | Krishnan et al. | |
| 2004/0213185 A1* | 10/2004 | Oh et al. | 370/335 |
| 2005/0105589 A1* | 5/2005 | Sung et al. | 375/130 |
| 2005/0128993 A1 | 6/2005 | Yu et al. | |
| 2005/0220199 A1 | 10/2005 | Sadowsky et al. | |
| 2005/0265226 A1 | 12/2005 | Shen et al. | |
| 2005/0289256 A1 | 12/2005 | Cudak et al. | |
| 2006/0120467 A1 | 6/2006 | Miyoshi et al. | |
| 2006/0160498 A1 | 7/2006 | Sudo | |
| 2007/0004465 A1 | 1/2007 | Papasakellariou et al. | |
| 2009/0060064 A1 | 3/2009 | Futaki et al. | |
| 2009/0129492 A1 | 5/2009 | Hamaguchi et al. | |
| 2011/0026615 A1 | 2/2011 | Miyoshi et al. | |

FOREIGN PATENT DOCUMENTS

| | | |
|---|---|---|
| JP | 9-205411 A | 8/1997 |
| JP | 11-196048 A | 7/1999 |
| JP | 2000-13310 A | 1/2000 |
| JP | 2000-354266 A | 12/2000 |
| JP | 2001-238251 A | 8/2001 |
| JP | 2003-333008 A | 11/2003 |
| JP | 2004-187257 A | 7/2004 |
| JP | 2004-241804 A | 8/2004 |
| JP | 2004-260692 A | 9/2004 |
| JP | 2005-6115 A | 1/2005 |
| JP | 2005-160079 A | 6/2005 |
| JP | 4302761 B2 | 7/2009 |
| JP | 4347410 B | 10/2009 |
| JP | 4382144 B | 12/2009 |
| JP | 4384710 B | 12/2009 |
| WO | WO-2004/040813 A1 | 5/2004 |
| WO | WO-2004/040827 A2 | 5/2004 |
| WO | WO 2004/095851 A2 | 11/2004 |
| WO | WO 2004/098072 A2 | 11/2004 |
| WO | WO 2005-060108 A2 | 6/2005 |
| WO | WO 2006/107037 A1 | 10/2006 |

OTHER PUBLICATIONS

Harada et al., "Dynamic Parameter Controlled OF/TDMA High-mobility Broadband Wireless Access System by Dynamic Parameter Controlled OF/TDMA," IEICE General Conference B-5-64, 2004, pp. 551.

Samsung, CQI Report and Scheduling Procedure, 3GPP TSG-RAN WG1 Meeting, #42bis Tdoc, R1-051045, pp. 1-4, Oct. 10, 2005.

Gomi, Hidekazu et al., "Fundamental Performance Evaluation of Dynamic Parameter Controlled OF/TDMA Based on PR-DSMA", Technical Report of IEICE, Nov. 12, 2004, RCS2004-223, pp. 1-6.

Harada, Hiroshi et al., "New Generation Mobile Communication System by Dynamic Parameter Controlled OF/TDMA", Technical Report of IEICE, Jan. 9, 2004, RCS2003-284, pp. 41-46.

* cited by examiner

METHOD AND APPARATUS FOR CONTROLLING POWER OF SUBCARRIERS IN A WIRELESS COMMUNICATION SYSTEM

TECHNICAL FIELD

The present invention relates to a wireless communication apparatus, mobile terminal and wireless communication method for performing wireless communication in a multicarrier transmission scheme using a plurality of frequency channels each of a group of a predetermined number of subcarriers among a plurality of subcarriers arranged successively at regular frequency intervals in a system band.

BACKGROUND ART

In recent years, with rapid penetration of cable broadband service such as ADSL, FTTH and the like in ordinary homes, the so-called rich content service has become widespread using speech, video and music beyond textual information, and an information amount for a person to handle has increased. Also in mobile communication, rates of using non-speech conversation service have been sharply increasing such as mobile Web, music distribution and the like, and demands for broadband wireless communication have grown as in cable communication.

For such requests for broadband mobile communication, various studies have been made. Among the studies, OFDMA (Orthogonal Frequency Division Multiple Access) is an access scheme receiving attention in terms of spectral efficiency, and fading resistance. OFDMA is the scheme for by using characteristics of OFDM for arranging densely a large number of orthogonal subcarriers at intervals of a reciprocal of a signal duration, allocating an arbitrary number of subcarriers (or a frequency channel comprised of a group of successive subcarriers) with good characteristics to each terminal corresponding to reception characteristics varying with terminals in multipath environments, and thereby further increasing substantial spectral efficiency.

The OFDM modulation scheme is adopted in wireless LAN specifications such as 5 GHz-band IEEE802.11a and the like, where channels having an occupied bandwidth of 16 MHz or more are arranged at intervals of 20 MHz. Accordingly, a region of 3 MHz or more without carriers exists between channels. Further, basically, a single terminal uses a single channel, a band for each terminal to be able to modulate and demodulate is the same as a band to communicate and is always constant, and therefore, this scheme does not correspond to OFDMA.

For OFDMA, any system put into practical use has not existed at the present time, but OFDMA is the system for allocating subcarriers and frequency channel of optimal reception states to each terminal from a wide band, and therefore, any proposals agree with one another in the concept that a band for a terminal to use in communication varies with a band for the terminal to be able to modulate and demodulate being the maximum band. Accordingly, a required frequency band is determined from the maximum transmission rate requested in a system, and communication apparatuses in the system are required to be able to collectively modulate and demodulate the frequency band. For example, in "IEICE Technical Report RCS2004-85(2004-06)", "2004 IEICE General Conference B-5-64" and the like, a frequency band of 100 MHz is expected to be required per user to realize 100 Mbps, and it is proposed to arrange subcarriers evenly in the band.

Non-patent Document 1: IEICE Technical Report RCS2004-85(2004-06)
Non-patent Document 2: 2004 IEICE General Conference B-5-64

DISCLOSURE OF INVENTION

Problems to be Solved by the Invention

The OFDMA scheme as described above is a scheme for selecting a frequency channel that is a group of an arbitrary number of successive subcarriers or carriers with good reception characteristics of a terminal from the entire band to allocate, and therefore, a transmitter/receiver basically needs to adopt a configuration capable of performing modulation and demodulation over the entire band. Accordingly, the need is eliminated of providing a frequency region without subcarriers between channels as in IEEE802.11a. Reversely, providing a frequency region without subcarriers between channels leads to reductions in spectral efficiency in the entire system, and to further severe requirements for hardware with expansion of a processing bandwidth of the communication apparatus. Although the transmitter/receiver implements broadband transmission by being able to modulate and demodulate over the entire band, devices used therein are required to have high performance, resulting in increases in terminal size and current consumption, and it is feared that such increases affect the cost.

However, users have various needs, and it is obvious that speech conversion and low-rate data communication is used mainly and that demands for low power consumption, small-size and inexpensive terminals exist rather than the functions. Accordingly, although broadband communication receives attention, it is important for the next-generation system to be able to absorb these needs. To realize inexpensive terminals, it is first considered limiting the band on which a terminal is able to perform collective processing. In this case, it is possible to suppress the band and current consumption in digital/analog conversion, power amplification and the like independently on the transmission side, but in order for the reception side to extract a specific band from subcarriers densely arranged, the need arises of tightening requirements for specifications of filters, analog/digital conversion, sampling clock of the conversion and the like to cancel adjacent channel interference, and is feared to be inhibition in providing inexpensive terminals.

The present invention is carried out in view of such circumstances, and it is an object of the invention to provide a wireless communication apparatus and wireless communication method for enabling wireless communication to be implemented also with a communicating apparatus that is a limited band terminal capable of receiving only part of frequencies.

SUMMARY OF THE INVENTION (1) To achieve the above-mentioned object, the present invention takes following measures. In other words, a wireless communication apparatus according to the invention is a wireless communication apparatus that performs wireless communication in a multicarrier transmission scheme using a plurality of frequency channels each of a group of a predetermined number of subcarriers among a plurality of subcarriers arranged successively at regular frequency intervals in a system band, and is characterized by having a frequency channel allocating section that allocates the frequency channels to communicating parties, a terminal reception quality information processing section that calculates an optimal modulation rate and required transmit power for each subcarrier based on reception quality information transmitted from each communicating apparatus, a subcarrier modulation section that performs modulation for each subcarrier, a subcarrier power control section that controls a level of transmit power for each subcarrier, and a determining section that checks a reception bandwidth of the communicating apparatus, while determining whether the communicating apparatus is a full band terminal capable of receiving all the frequency channels in the system band or is a limited band terminal capable of receiving only part of frequencies, where as a result of the determination, when the communicating apparatus to which a frequency allocation is made is the limited band terminal, the subcarrier power control section decreases the transmit power of all or part of subcarriers of a frequency channel that is adjacent to a reception band allocated to the communicating apparatus and that is allocated to another communicating apparatus.

Thus, when the communicating apparatus to which the frequency allocation is made is the limited band terminal, the transmit power is decreased in all or part of subcarriers of a frequency channel that is adjacent to a reception band allocated to the communicating apparatus and that is allocated to another communicating apparatus. Therefore, in the case of using a low sampling frequency for low power consumption in the communicating apparatus, it is also possible to reduce an effect of an adjacent communication slot in the frequency channel direction. It is thereby possible to implement wireless communication also with the limited band terminal capable of receiving only part of frequencies.

(2) Further, in the wireless communication apparatus according to the invention, the subcarrier power control section is characterized by performing control to set zero on the transmit power of all the subcarriers of the frequency channel adjacent to the reception band allocated to the communicating apparatus that is the limited band terminal.

Thus, by performing control to set zero on the transmit power of all the subcarriers of the frequency channel adjacent to the reception band allocated to the communicating apparatus that is the limited band terminal, it is possible not to allocate any other communicating apparatus to the adjacent slot. As a result, it is possible to further reduce the effect of the adjacent communication slot in the frequency channel direction.

(3) Further, in the wireless communication apparatus according to the invention, the subcarrier modulation section is characterized by when another communicating apparatus is allocated the frequency channel adjacent to the reception band allocated to the communicating apparatus that is the limited band terminal, decreasing a modulation rate of the subcarriers of which the transmit power is decreased in the frequency channel.

Thus, when another communicating apparatus is allocated the frequency channel adjacent to the reception band allocated to the communicating apparatus that is the limited band terminal, a modulation rate is decreased in the subcarriers of which the transmit power is reduced in the frequency channel. It is thereby possible to decrease the level of transmit power, while making the communicating apparatus demodulate correctly the communication slot. By this means, it is possible to further reduce the effect of the adjacent communication slot in the frequency channel direction.

(4) Further, in the wireless communication apparatus according to the invention, the frequency channel allocating section is characterized by when the communicating apparatus is the limited band terminal, preferentially performing a frequency channel allocation so that at least one edge of the reception band of the communicating apparatus is a frequency channel at an edge of the system band.

Thus, when the communicating apparatus is the limited band terminal, the frequency channel allocation is preferentially performed so that at least one edge of the reception band of the communicating apparatus is a frequency channel at an edge of the system band. Therefore, it is possible to limit the communication slot, where the levels of transmit power are decreased in all or part of the subcarriers, or the level of transmit power is set at zero, only to one side in the frequency channel direction. The communication slots can thus be used effectively.

(5) Further, in the wireless communication apparatus according to the invention, the frequency channel allocating section is characterized by when a plurality of communicating parties each of which is the limited band terminal exists, allocating frequency channels while skipping a frequency channel adjacent to the reception band allocated to a communicating apparatus that is the limited band terminal to connect the frequency channel to the reception band of another limited band terminal.

Thus, when a plurality of communicating parties each of which is the limited band terminal exists, frequency channels are allocated while a frequency channel adjacent to the reception band allocated to a communicating apparatus that is the limited band terminal is skipped to be connected to the reception band of another limited band terminal. Therefore, it is possible to share the communication slot where the levels of transmit power are decreased in all or part of the subcarriers, or the level of transmit power is set at zero. The communication slots can thus be used effectively.

(6) Further, in the wireless communication apparatus according to the invention, the frequency channel allocating section is characterized by when the communicating apparatus is the limited band terminal having a reception bandwidth of three frequency channels or more and does not use frequency channels at opposite edges of the allocated reception band, allocating a frequency channel adjacent to the reception band allocated to the communicating apparatus to another communicating apparatus.

Thus, when the communicating apparatus is the limited band terminal having a reception bandwidth of three frequency channels or more and does not use frequency channels at opposite edges of the allocated reception band, another communicating apparatus is allocated a communication slot that is adjacent to the frequency channel which is not used and that is not allocated to the communicating apparatus. It is thereby possible to use the communication slots effectively.

(7) Further, in the wireless communication apparatus according to the invention, the frequency channel allocating section is characterized by when the limited band terminals exist and have reception bandwidths only of odd numbers of frequency channels, allocating frequency channels to a plurality of communicating parties that are the limited band terminals in a unified manner so that a frequency channel at the edge of the reception band accords with either an odd-numbered frequency channel or an even-numbered frequency channel starting counting at one edge of the system band.

Thus, when the limited band terminals exist, only in the case where the reception bandwidths of the terminals are of odd numbers of frequency channels, frequency channels are allocated to a plurality of communicating parties that are the limited band terminals in a unified manner so that a frequency channel at the edge of the reception band of each of the communicating parties accords with one of an odd-numbered frequency channel and an even-numbered frequency channel starting counting at one edge of the system band. Therefore, it is possible to share the communication slot where the levels of transmit power are decreased in all or part of the subcarriers, or the level of transmit power is set at zero. The communication slots can thus be used effectively.

(8) Further, the wireless communication apparatus according to the invention is characterized by at substantially regular intervals or when it is found that frequency channels are not evenly allocated to odd-numbered channels and even-numbered channels, switching the frequency channel corresponding to the edge of the reception band of each of the limited band terminals between the odd-numbered frequency channel and the even-numbered frequency channel.

When frequency channels with good reception quality of full band terminals are large on the unified frequency channel side, since allocations are not even, the unified channels are switched between odd-numbered channels and even-numbered channels at substantially regular intervals. Alternately, by switching the channels when unevenness is found, the allocations can be dispersed, and it is possible to perform more efficient data transmission.

(9) Further, in the wireless communication apparatus according to the invention, the subcarrier power control section is characterized by for a period during which frequency channels corresponding to opposite edges of the reception band of the limited band terminal are unified to either even-numbered frequency channels or odd-numbered frequency channels starting counting at the low-frequency side of the system band, performing control so that part or all of the subcarriers in the unified frequency channels have power levels higher than those of subcarriers in adjacent frequency channels.

Thus, it is possible to relatively decrease the transmit power of the communication slot, where the levels of transmit power are decreased in all or part of the subcarriers, or the level of transmit power is set at zero, near boundaries of frequency channels corresponding to the opposite edges of the reception band of the limited band terminal. It is thereby possible to improve the effect of aliasing in control information of the limited band terminal, and the demodulation capability is further improved.

(10) Further, a wireless communication apparatus according to the invention is a wireless communication apparatus that performs wireless communication in a multicarrier transmission scheme using a plurality of frequency channels each of a group of a predetermined number of subcarriers among a plurality of subcarriers arranged successively at regular frequency intervals in a system band, and is characterized by having a frequency channel allocating section that allocates the frequency channels to communicating parties, a subcarrier modulation section that performs modulation for each subcarrier, a subcarrier power control section that controls a level of transmit power for each subcarrier, and a determining section that checks a reception bandwidth of the communicating apparatus, while determining whether the communicating apparatus is a full band terminal capable of receiving all the frequency channels in the system band or is a limited band terminal capable of receiving only part of frequencies, where as a result of the determination, when the communicating apparatus is the limited band terminal, the subcarrier power control section performs control to set the transmit power at zero in part of subcarriers in the frequency channel allocated to the communicating apparatus.

Thus, when the communicating apparatus is the limited band terminal, the control is performed to set the transmit power at zero in part of subcarriers in the frequency channel allocated to the communicating apparatus. Therefore, in the case of using a low sampling frequency for low power consumption in the communicating apparatus, it is also possible to reduce an effect of an adjacent communication slot in the frequency channel direction.

(11) Further, a wireless communication apparatus of the invention is a wireless communication apparatus that performs wireless communication in a multicarrier transmission scheme using a plurality of frequency channels each of a group of a predetermined number of subcarriers among a plurality of subcarriers arranged successively at regular frequency intervals in a system band, and is characterized by having a terminal reception quality information processing section that calculates an optimal modulation rate and required transmit power for each subcarrier from the reception quality information transmitted from each communicating apparatus, a frequency channel allocating section that allocates the frequency channels to communicating parties, and a determining section that checks a reception bandwidth of the communicating apparatus, while determining whether the communicating apparatus is a full band terminal capable of receiving all the frequency channels in the system band or is a limited band terminal capable of receiving only part of frequencies, where the terminal reception quality information processing section calculates required transmit power of a terminal to which a frequency channel adjacent to the reception band of the limited band terminal can be allocated, and the frequency channel allocating section allocates the adjacent channel to a terminal with the required transmit power lower than the transmit power of the limited band terminal among terminals for which the required transmit power is calculated.

Thus, the required transmit power is calculated for terminals to which a frequency channel adjacent to the reception band of the limited band terminal can be allocated, and the adjacent channel is allocated to a terminal with the required transmit power lower than the transmit power of the limited band terminal among the terminals for which the required transmit power is calculated. Therefore, in the case of using a low sampling frequency for low power consumption in the communicating apparatus, it is also possible to reduce an effect of an adjacent communication slot in the frequency channel direction. It is thereby possible to implement wireless communication also with the limited band terminal capable of receiving only part of frequencies.

(12) A mobile terminal according to the invention is a mobile terminal that performs wireless communication in a multicarrier transmission scheme using a plurality of frequency channels each of a group of a predetermined number of subcarriers among a plurality of subcarriers arranged successively at regular frequency intervals in a system band, and is characterized by having a propagation path estimating section that estimates a propagation path state, and a data generating section that generates reception quality information of a frequency channel based on the propagation path state obtained by the propagation path estimation, where the data generating section reports that part of subcarriers have quality of a communication disabled level to a communicating apparatus irrespective of reception quality of the subcarriers in generating the reception quality information.

Thus, the terminal reports that part of subcarriers have quality of a communication disabled level to a communicating apparatus irrespective of reception quality of the subcarriers in generating the reception quality information, and is thus capable of reducing an effect of a communication slot adjacent in the frequency channel direction to a communication slot allocated to the terminal. It is thereby possible to construct a wireless communication system for implementing wireless communication with the limited band terminal.

(13) Further, a wireless communication method according to the invention is a wireless communication method for performing wireless communication in a multicarrier transmission scheme using a plurality of frequency channels each of a group of a predetermined number of subcarriers among a plurality of subcarriers arranged successively at regular frequency intervals in a system band, and is characterized by including at least a step of checking a reception bandwidth of a communicating apparatus, while determining whether the communicating apparatus is a full band terminal capable of receiving all the frequency channels in the system band or is a limited band terminal capable of receiving only part of frequencies, and a step of decreasing transmit power of all or part of subcarriers of a frequency channel that is adjacent to a reception band allocated to the communicating apparatus and that is allocated to another communicating apparatus when the communicating apparatus to which a frequency allocation is made is the limited band terminal as a result of the determination.

Thus, when the communicating apparatus to which the frequency allocation is made is the limited band terminal, the transmit power is decreased in all or part of subcarriers of a frequency channel that is adjacent to a reception band allocated to the communicating apparatus and that is allocated to another communicating apparatus. Therefore, in the case of using a low sampling frequency for low power consumption in the communicating apparatus, it is also possible to reduce an effect of an adjacent communication slot in the frequency channel direction. It is thereby possible to implement wireless communication also with the limited band terminal capable of receiving only part of frequencies.

(14) Further, a wireless communication method according to the invention is a wireless communication method for performing wireless communication in a multicarrier transmission scheme using a plurality of frequency channels each of a group of a predetermined number of subcarriers among a plurality of subcarriers arranged successively at regular frequency intervals in a system band, and is characterized by including at least a step of allocating the frequency channels to communicating parties, a step of checking a reception bandwidth of a communicating apparatus, while determining whether the communicating apparatus is a full band terminal capable of receiving all the frequency channels in the system band or is a limited band terminal capable of receiving only part of frequencies, and a step of setting transmit power at zero in part of subcarriers in the frequency channel allocated to the communicating apparatus when the communicating apparatus is the limited band terminal as a result of the determination.

Thus, by setting zero on the transmit power of all the subcarriers of the frequency channel adjacent to the reception band allocated to the communicating apparatus that is the limited band terminal, it is possible not to allocate any other communicating apparatus to the adjacent slot. As a result, it is possible to further reduce the effect of the adjacent communication slot in the frequency channel direction.

(15) Further, a wireless communication method according to the invention is a wireless communication method for performing wireless communication in a multicarrier transmission scheme using a plurality of frequency channels each of a group of a predetermined number of subcarriers among a plurality of subcarriers arranged successively at regular frequency intervals in a system band, and is characterized by including at least a step of calculating required transmit power of a terminal to which a frequency channel adjacent to a reception band of a limited band terminal capable of receiving only part of frequencies can be allocated, and a step of allocating the adjacent channel to a terminal with the required transmit power lower than the transmit power of the limited band terminal among terminals for which the required transmit power is calculated.

Thus, the required transmit power is calculated for terminals to which a frequency channel adjacent to the reception band of the limited band terminal can be allocated, and the adjacent channel is allocated to a terminal with the required transmit power lower than the transmit power of the limited band terminal among the terminals for which the required transmit power is calculated. Therefore, in the case of using a low sampling frequency for low power consumption in the communicating apparatus, it is also possible to reduce an effect of an adjacent communication slot in the frequency channel direction. It is thereby possible to implement wireless communication also with the limited band terminal capable of receiving only part of frequencies.

ADVANTAGEOUS EFFECT OF THE INVENTION

According to the invention, when the communicating apparatus to which the frequency allocation is made is the limited band terminal, the transmit power is decreased in all or part of subcarriers of a frequency channel that is adjacent to a reception band allocated to the communicating apparatus and that is allocated to another communicating apparatus. Therefore, in the case of using a low sampling frequency for low power consumption in the communicating apparatus, it is also possible to reduce an effect of an adjacent communication slot in the frequency channel direction. It is thereby possible to implement wireless communication also with the limited band terminal capable of receiving only part of frequencies.

Figure 1:
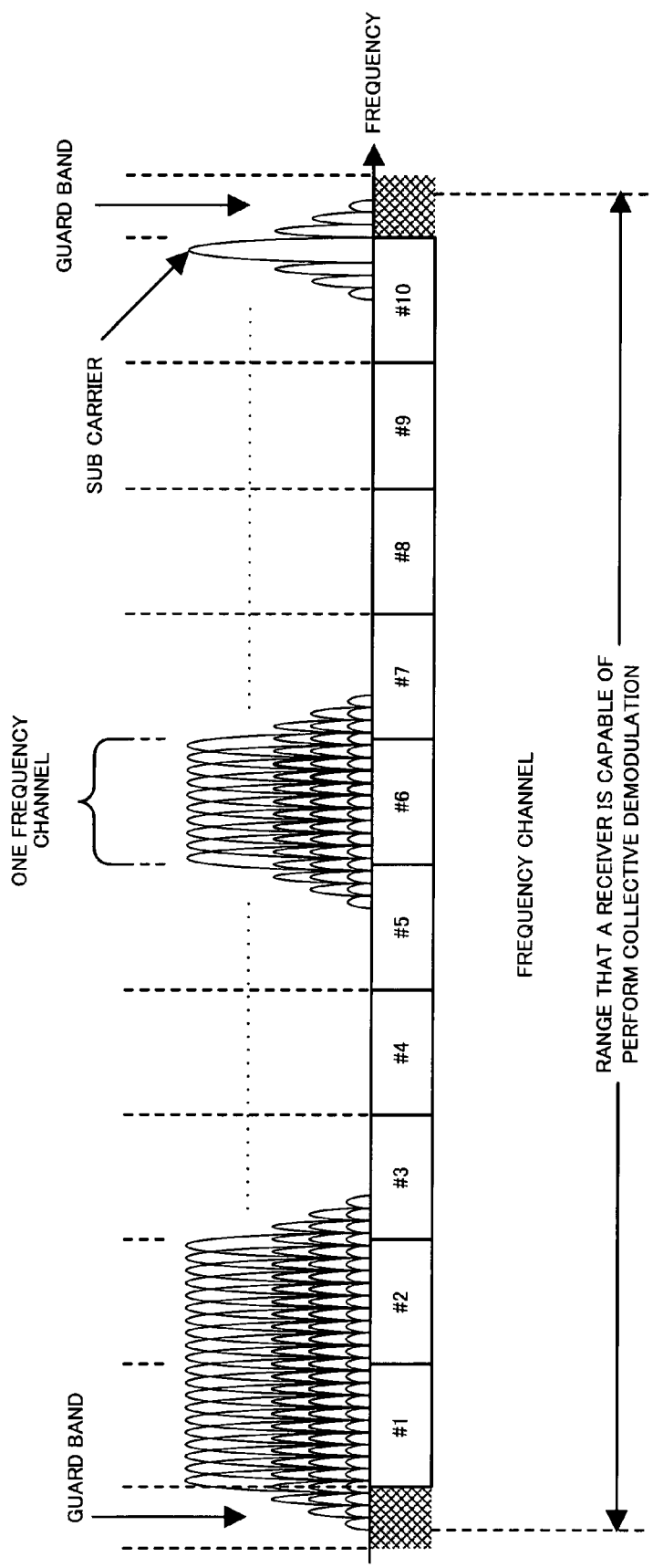
FIG. 1 is a diagram showing an example of a frequency channel arrangement on downlink in an OFDMA communication system.

1 Antenna section
2 High-frequency circuit and analog processing section
3 FFT section
4 Equalizing section
5 Subcarrier demodulation section
6 Terminal reception quality information processing section
7 Control section
8 User information storage section
9 Transmission data buffer
10 Scheduling section
10-1 Determining section
10-3 Frequency channel allocating section
11 Subcarrier modulation section
12 Subcarrier power control section
13 IFFT section
161 Antenna section
162 High-frequency circuit section
163 Propagation path estimating section
164 FFT section
165 Equalizing section
166 Subcarrier demodulation section
167 Reception quality information data generating section
168 Control section
169 Transmission signal processing section

DETAILED DESCRIPTION

Wireless transmission apparatuses according to embodiments will be described below. These embodiments are predicted on the above-mentioned communication scheme by OFDMA.

FIG. 1 is a diagram showing an example of a frequency channel arrangement on downlink (hereinafter, referred to as "DL") in an OFDMA communication system. In FIG. 1, as shown at the right end as viewed in figure, in OFDMA, subcarriers are arranged uniformly at intervals to be orthogonal to one another on the frequency axis. OFDMA is a scheme for allocating an optimal number of subcarriers corresponding to a required band of each user. Further, as shown in the center of FIG. 1, in OFDMA, there is a case where a single frequency channel comprised of an arbitrary number of subcarriers is formed, and allocations are made on a frequency channel basis. Shown herein is an example where a range for a receiver to be able to collectively perform demodulation is comprised of ten frequency channels. As shown in FIG. 1, the frequency channels are arranged successively in principle. Further, to suppress interference with adjacent other systems, guard bands are arranged at opposite sides of the entire band. This is a typical DL structure, but this structure may be one unit to form the band comprised of a plurality of units. In this embodiment, the entire reception band means this one unit, and the full band terminal means a terminal capable of collectively processing the entire band.

Figure 2:
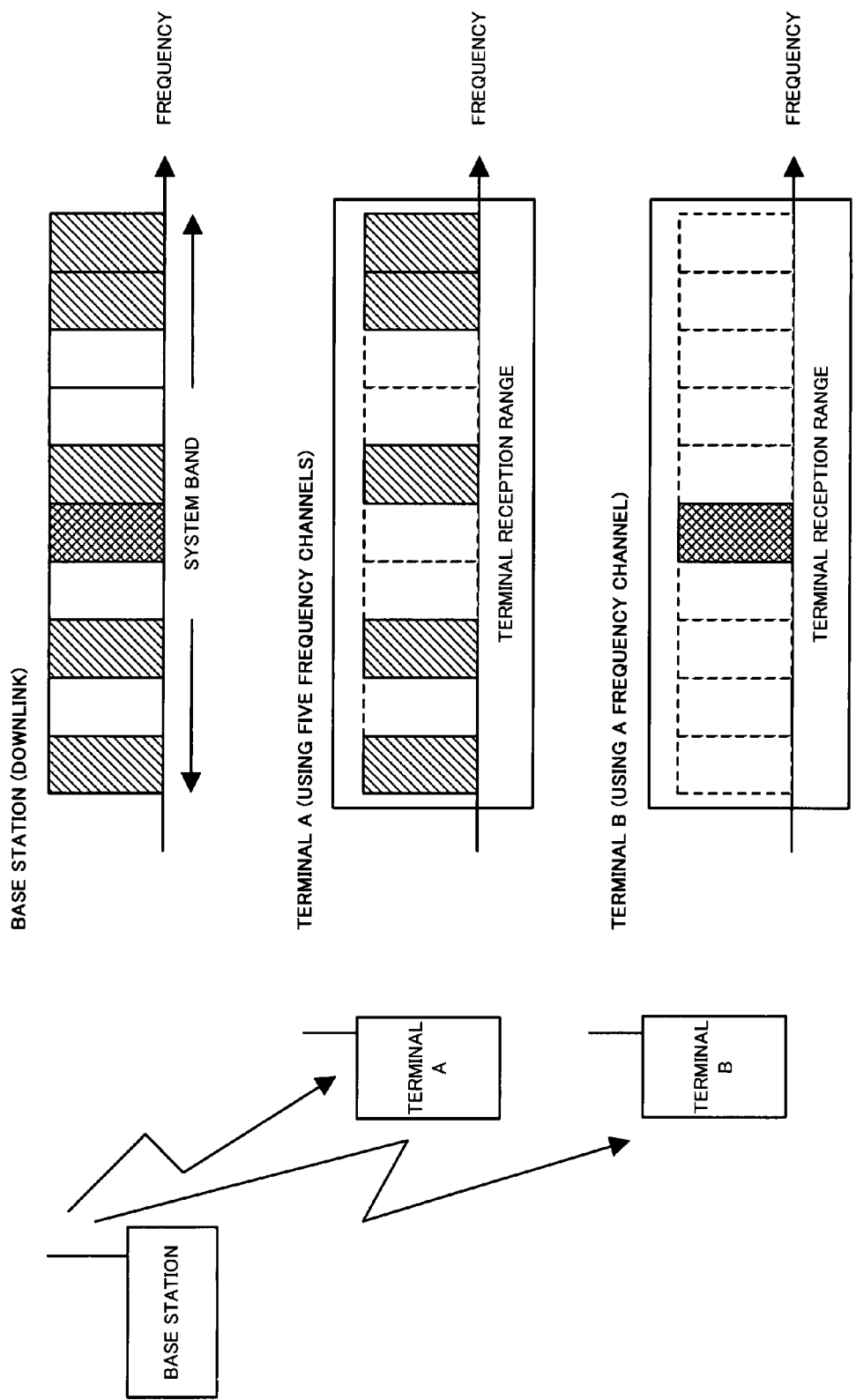
FIG. 2 is a diagram illustrating channels used by a base station and terminals in the OFDMA communication system.

FIG. 2 is a diagram illustrating channels used by a base station and terminals in the OFDMA communication system. Shown herein is a state where in the system comprised of ten frequency channels as shown in FIG. 1, terminals A and B perform communication while respectively requesting five frequency channels and one frequency channel. Both A and B are capable of performing demodulation over the entire band, and by concurrently using respectively allocated five channels and one channel, implement multiple access. Thus, one channel is sometimes enough for each terminal, and it is also possible to support broadband transmission requesting maximum ten frequency channels.

Meanwhile, by introducing terminals (hereinafter, referred to as "limited band terminals") each of which is limited in the number of processable frequency channels and has a reception band narrower than the system bandwidth, requirements for functions necessary for the terminals are lowered, and it is possible to realize power saving and low cost. Further, needs of users are considered existing to a large extent such that speech conversation and low-rate data communication is sufficient, and introduction of the limited band terminals is thought to be significant.

Figure 3:
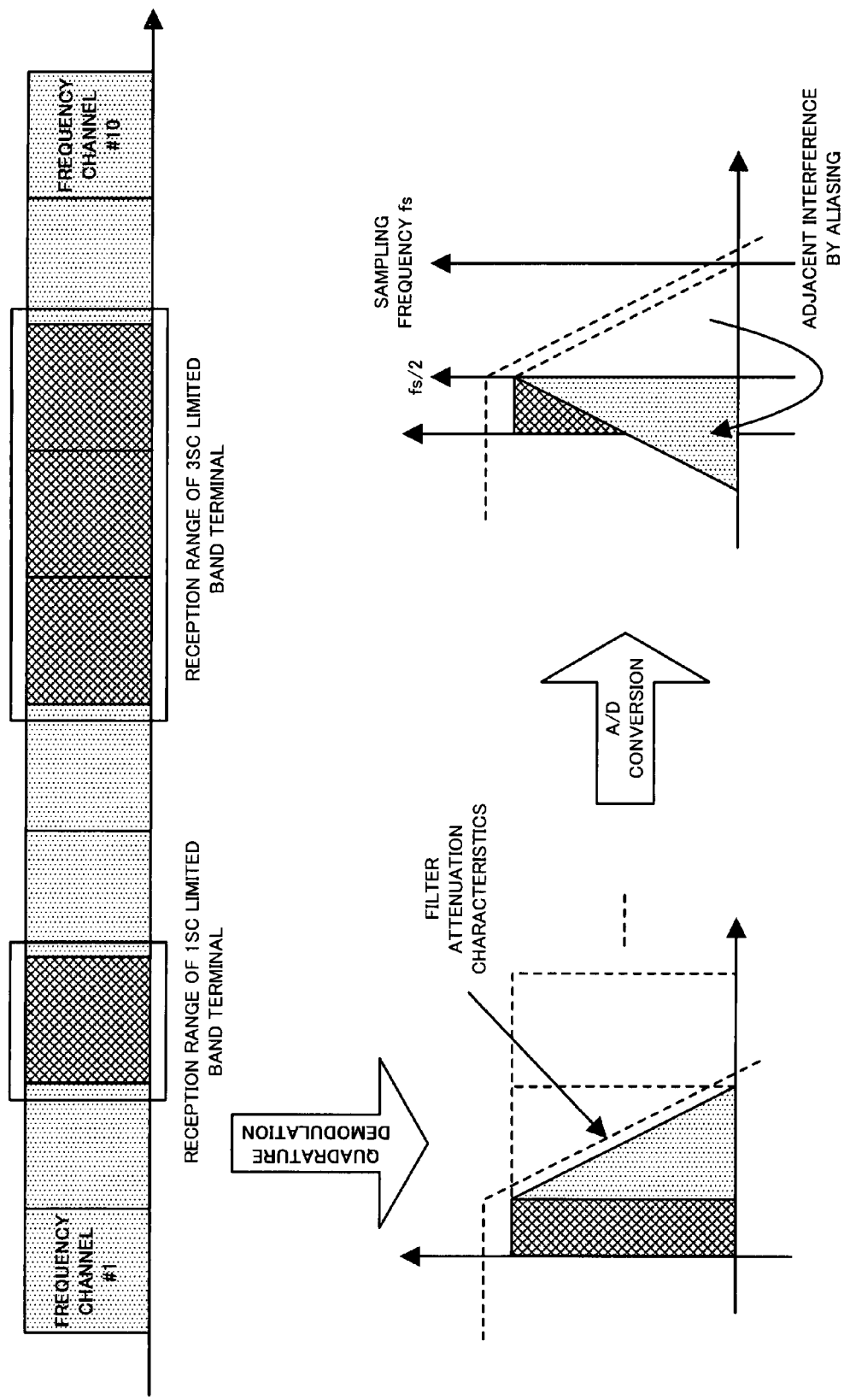
FIG. 3 is a diagram illustrating the effect of aliasing in a terminal limited in the number of processable frequency channels.

However, as shown in FIGS. 1 and 2, OFDMA is the system introduced for the purpose of enhancing the spectral efficiency, and a region corresponding to a guard band as in wireless LAN of IEEE802.11a is not provided between frequency channels. Therefore, it is feared to undergo interference from adjacent frequency channels in the frequency channel direction. This state is shown in FIG. 3. FIG. 3 shows a state where limited terminals with the reception band of one frequency channel (abbreviated as SC in the figure) and with the reception band of three frequency channels exist in the system band, while showing at the lower side the processing on the reception side of the one-frequency channel limited band terminal. Herein, the maximum frequency desired to demodulate agrees with half the sampling frequency of an analog/digital converter (hereinafter, referred to as "ADC"), and the filter attenuates with the bandwidth of the adjacent channel. As a result, as shown at the lower side of FIG. 3, the effect of aliasing is imposed. Therefore, in the embodiments, the effects from the adjacent channels are reduced by methods as described below.

First Embodiment

Figure 4:
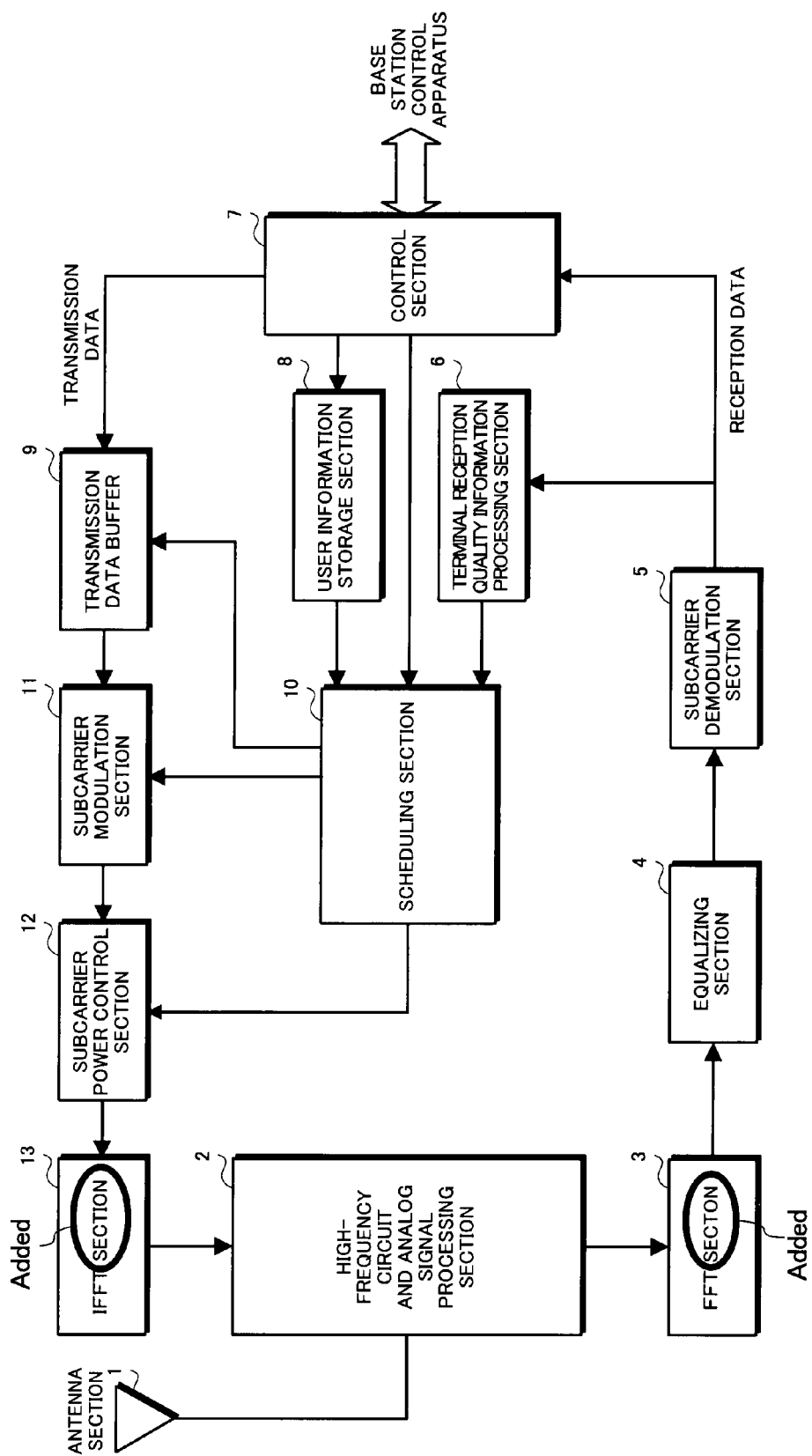
FIG. 4 is a block diagram illustrating a schematic configuration of a base station according to the first embodiment.

FIG. 4 is a block diagram illustrating a schematic configuration of a base station according to the first embodiment. A radio signal received in an antenna section 1 is converted from a radio signal to an electrical signal by a high-frequency circuit and analog signal processing section 2, and subjected to FFT (Fast Fourier Transform) in an FFT section 3. Next, an equalizing section 4 corrects a reception waveform deteriorating due to delay distortion in multipath and the like, and a subcarrier demodulation section 5 performs demodulation for each subcarrier.

Then, a terminal reception quality information processing section 6 analyzes reception quality information received from each terminal. In other words, in the above-mentioned limited band terminal, for the reception quality information of frequency channels with better reception conditions on downlink, frequency channels predetermined in the system or the like, the reception quality that the terminal is capable of measuring once is only of the limited band. Then, the terminal notifies the base station of the reception information on the limited band. Further, such a method may be adopted that channels are monitored and notified in a time division manner. The full band terminal is naturally capable of measuring the reception quality over the entire band, and reports all the results to the base station. Furthermore, such a method may be adopted that a terminal reports only the information of a better frequency channel for the terminal.

Further, in FIG. 4, via a control section 7 that controls the entire base station, a "base station control apparatus" inputs information to a user information storage section 8. The information is to determine whether a terminal accessing the base station is a full band terminal or a limited band terminal, and further includes a terminal type indicative of channels that the terminal supports and service contract information when the terminal is the limited band terminal. Meanwhile, data to be transmitted to each terminal from the base station is once stored in a transmission data buffer 9 together with information indicating whether the data is of real time or not. A scheduling section 10 performs prioritization based on these pieces of information so as to transmit the data.

Herein, factors for prioritization of frequency channel allocation are as follows: "Whether the data is of real time or non-real time" . . . a higher priority is given to real time data communication;

"Optimal bandwidth" . . . a higher priority is given to a larger request data transfer amount;

"Reception characteristics due to distance and multipath" . . . the quality of a reception state of a frequency channel transmitted from each terminal is compared with one another, and the frequency channel is allocated to a terminal to which data can be transmitted as much as possible; and "Type of used service" . . . the priority varies with differences in used service systems of subscribers. For example, priorities are given in consideration of a user that suppress a basic fee per month and does not request high quality during busy hours, and service for selecting and designating quality for each call. Further, for example, in the case that the data is a real-time broadcast but the quality is not required, a lower priority is given.

In FIG. 4, a subcarrier modulation section 11 performs modulation for each subcarrier, and a subcarrier power control section 12 controls the transmit power for each subcarrier. Then, an IFFT section 13 performs IFFT (Inverse Fast Fourier Transform) processing, an electrical signal is converted into a digital signal in the high-frequency circuit and analog signal processing section 2, and the radio signal is transmitted from the antenna section 1.

Figure 5:
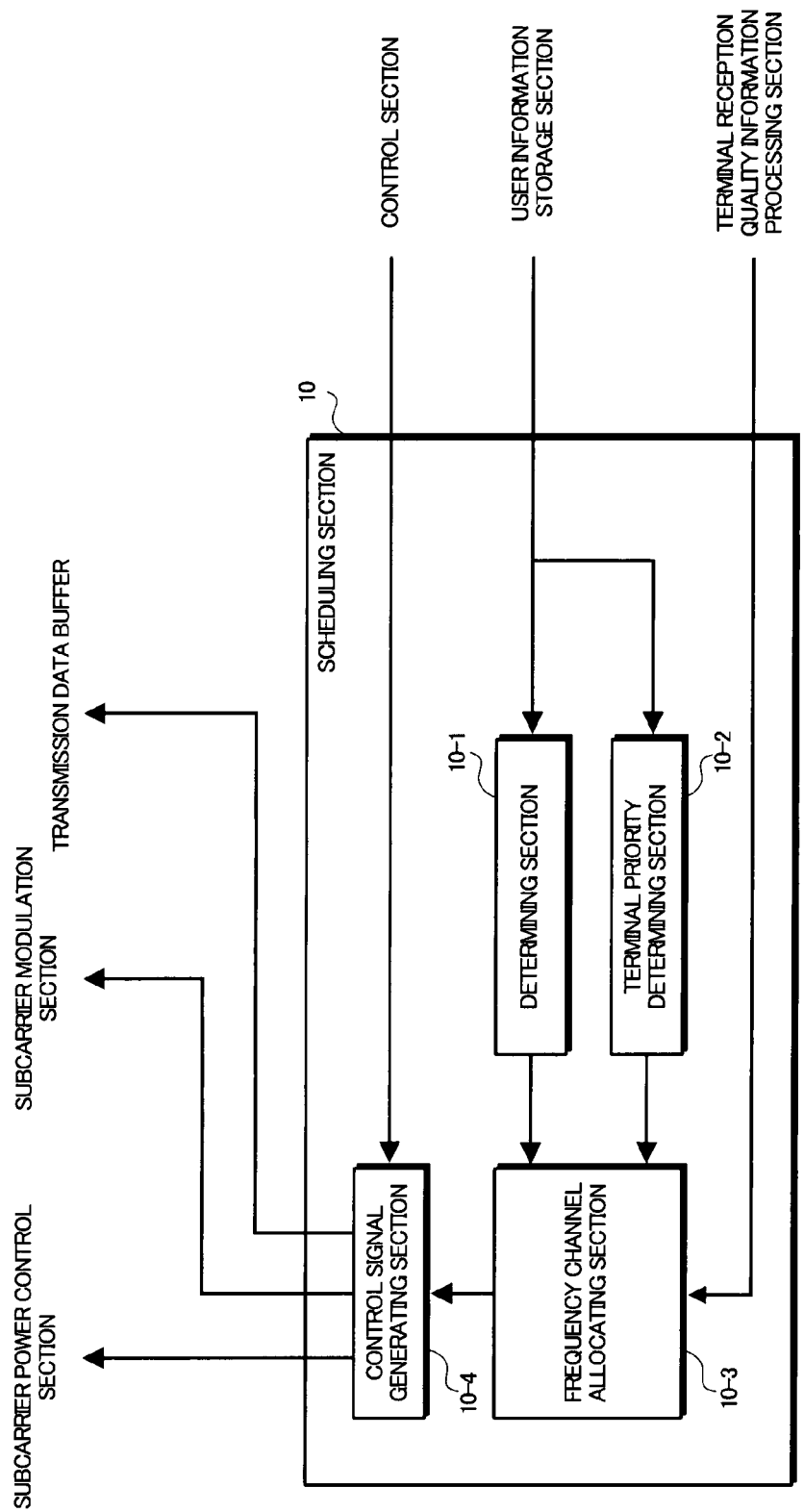
FIG. 5 is a block diagram illustrating a configuration of a scheduling section in the base station according to the first embodiment.

FIG. 5 is a block diagram illustrating a configuration of the scheduling section 10 in the base station according to the first embodiment. Information of a terminal under communications is input to a determining section 10-1 and a terminal priority determining section 10-2 from the user information storage section 8 that has information of all terminals accessing the base station. The determining section 10-1 determines whether the terminal is a limited band terminal or full band terminal. Based on the real time characteristic of the data, data amounts stored in the transmission buffer 9 and the like, the terminal priority determining section 10-2 determines allocation priorities among terminals. Based on the result determined by the determining section 10-1 and the allocation priorities determined by the terminal priority determining section 10-2, a frequency channel allocating section 10-3 allocates a frequency channel for each terminal to use, modulation mode of each subcarrier, and transmit power, and outputs these items to a control signal generating section 10-4.

The control signal generating section 10-4 outputs the frequency channel for each terminal to use, modulation mode of each subcarrier, and transmit power allocated by the frequency channel allocating section 10-3 to the transmission data buffer 9, subcarrier modulation section 11 and subcarrier power control section 12, in synchronization with the control section 7.

Figure 6:
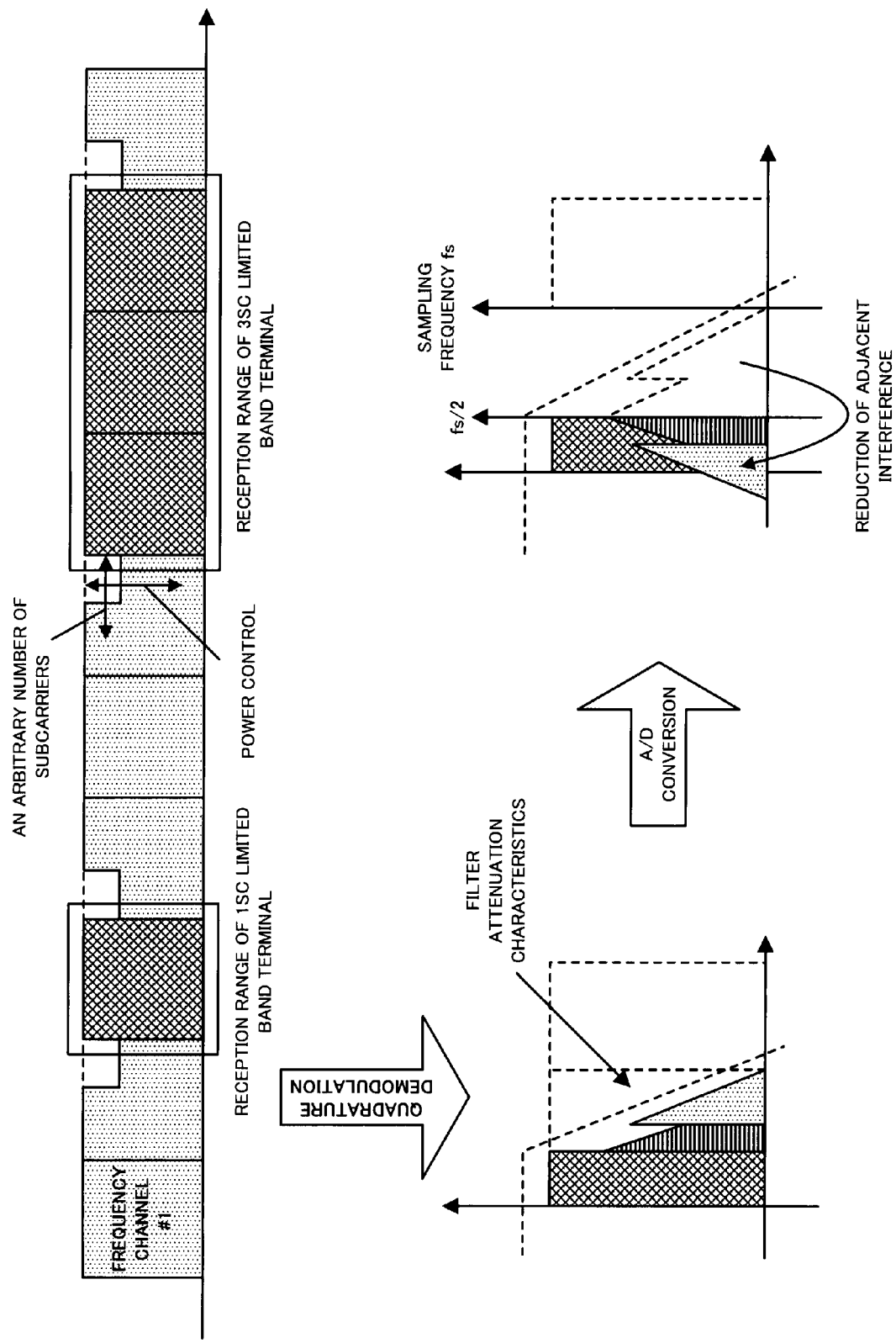
FIG. 6 is a diagram showing an example of a frequency channel arrangement on DL in the OFDMA communication system according to the first embodiment.

FIG. 6 is a diagram showing an example of a frequency channel arrangement on DL in the OFDMA communication system according to the first embodiment. The base station recognizes that the frequency channel allocation is for the limited band terminal, and decreases levels of the transmit power of an arbitrary number of subcarriers from the adjacent side of a frequency channel adjacent to the reception band of the terminal, or sets zero on levels of the transmit power of the subcarriers. For example, in FIG. 6, the levels of the transmit power of an arbitrary number of subcarriers are decreased in opposite adjacent frequency channels of the range enabling reception of the terminal limited in the number of processable frequency channels to one frequency channel (1SC). Similarly, the levels of the transmit power of an arbitrary number of subcarriers are decreased in opposite adjacent frequency channels of the range enabling reception of the terminal limited in the number of processable frequency channels to three frequency channels (3SC). By this means, even when the effect of aliasing is produced in performing A/D conversion, since the transmit power is decreased, the effect of aliasing is reduced. In addition, the number of subcarriers of which the transmit power levels are decreased can be set arbitrarily in the OFDMA communication system.

Figure 7:
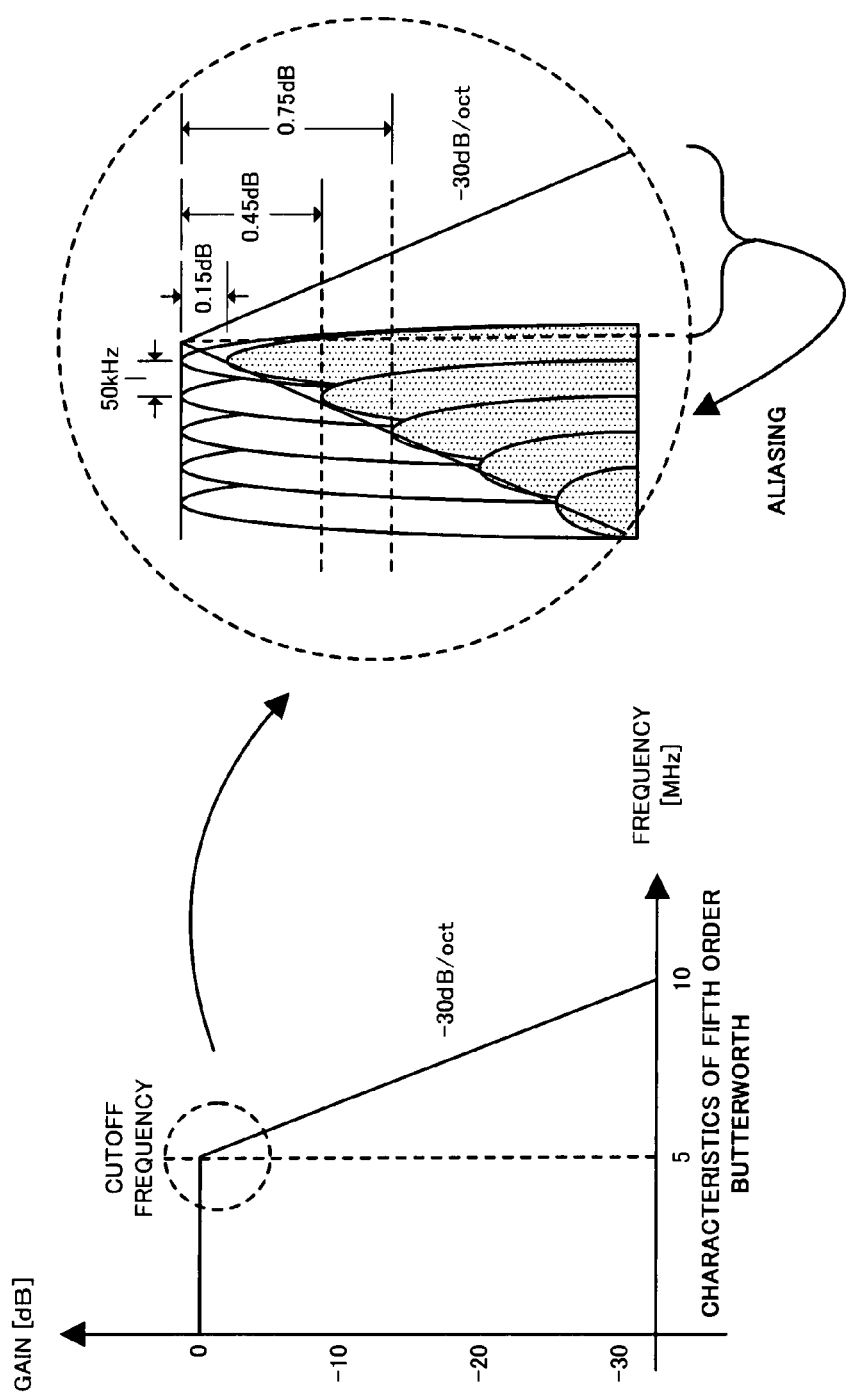
FIG. 7 is a diagram showing an example of attenuation characteristics of a filter.

FIG. 7 is a diagram showing an example of attenuation characteristics of a filter. In a low-pass filter (LPF) prior to the ADC, the type and the order of the filter are determined depending on properties, circuit scale and the like. In a Butterworth type filter, the attenuation gradient (dB/oct.) of 6 dB x order is generally obtained. Herein, for simplicity, explanations are given while assuming that a signal band is 5 MHz by performing quadrature demodulation on 10 MHz, the cutoff frequency is 5 MHz, and that a fifth order Butterworth filter is used. Gain (attenuation) is 0 dB from 0 Hz to 5 MHz and flat, and since the fifth order is used, is −30 dB at 10 MHz. Further, intervals of subcarriers are assumed to be 50 kHz.

When a virtual model with the reception power assumed to be flat is considered, aliasing is −0.15 dB, next −0.45 dB, −0.75 dB, . . . at the maximum frequency, and thus overlaps as interfering signals. As types of LPF, there are Butterworth, Bessel, Chebyshev, elliptic types and the like, and it is considered that the elliptic filter with steeper attenuation characteristics is suitable for the limited band terminal in the first embodiment. Even when the characteristics become steeper, it is also impossible to attenuate subcarriers close to the boarder, and it is understood that the adverse effect is produced.

In addition, when decreasing the levels of the transmit power of an arbitrary number of subcarriers from the adjacent side of a frequency channel adjacent to the reception band of the band limited terminal, modulation rates may be decreased. In other words, the transmit power of a level such that a predetermined signal to noise ratio is obtained is allocated to a subcarrier to be modulated at a low modulation rate. By this means, it is possible to decrease the level of transmit power, while making the communicating apparatus demodulate correctly the communication slot, and to further reduce the effect of an adjacent communication slot in the frequency axis direction.

Figure 8:
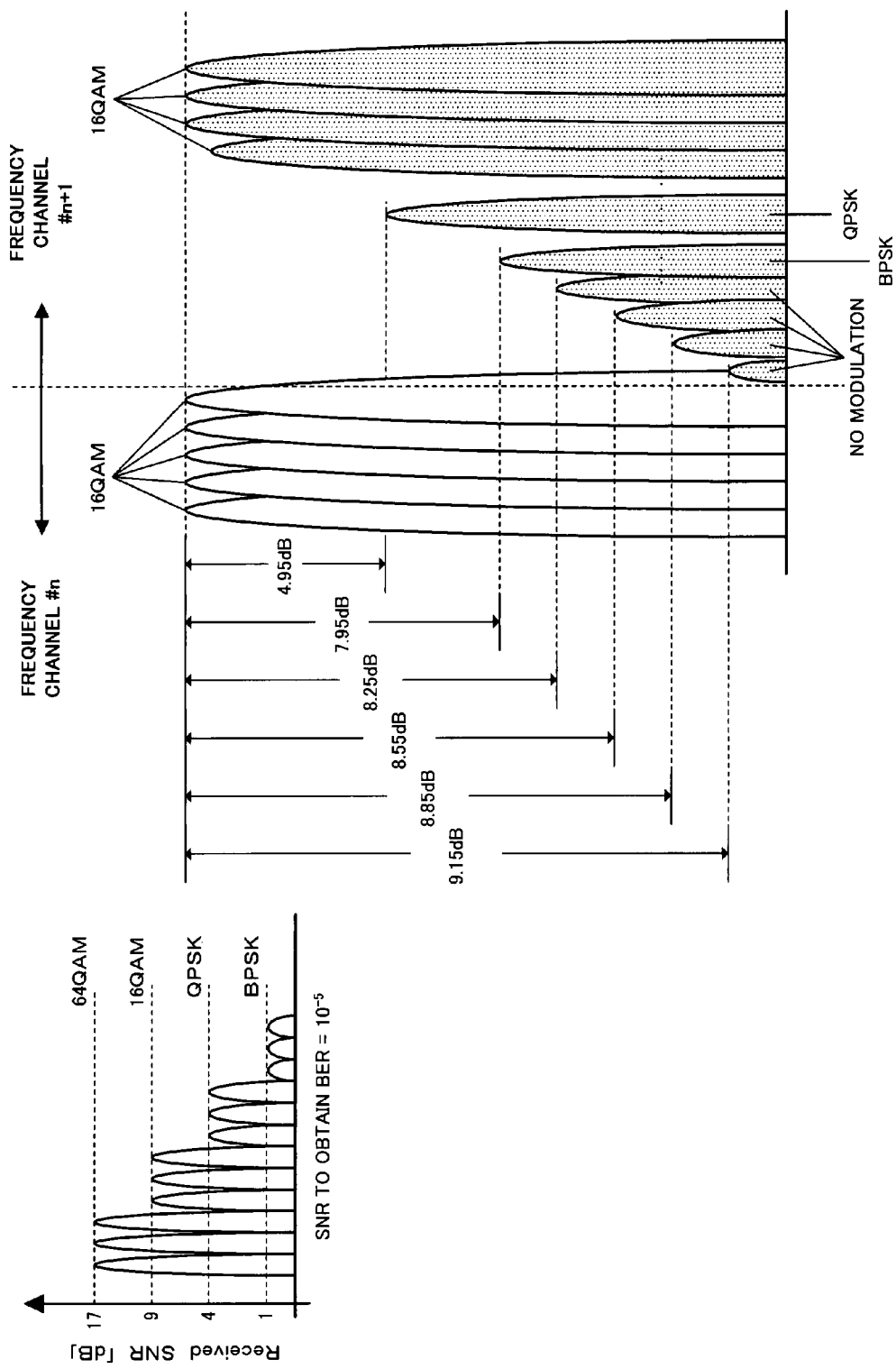
FIG. 8 is a diagram illustrating the relationship between the level of transmit power and the modulation rate.

FIG. 8 is a diagram illustrating the relationship between the level of transmit power and the modulation rate. In FIG. 8, shown on the left side as viewed in the figure is an example of the signal to noise ratio (SNR) enabling bit error rate (BER) $10^{-5}$ to be obtained. The horizontal axis in the figure is no meaning, and it is shown that SNR of 17 dB, 9 dB, . . . is able to achieve BER=$10^{-5}$ at 64QAM, 16QAM, . . . , respectively. In FIG. 8, shown on the right side as viewed in the figure is an example of implementing the first embodiment in the BER characteristic and filter characteristics as shown in FIG. 7. This is a case that the limited band terminal is allocated to frequency channel #n, and that the full band terminal is allocated to frequency channel #n+1.

At this point, in order for the limited band terminal to be able to secure 16QAM, the power of −9.15, −8.85, −8.55 dB . . . −0.45, −0.15, 0 dB is allocated successively to subcarriers closer to #n in #n+1. In this example, the thirty-second subcarrier is 0 dB. Further, modulation is allocated in the order of no modulation, BPSK, QPSK and 16QAM which is first allocated in the thirty-second subcarrier. Only one side of the frequency channel is described in the foregoing, and when a frequency channel at either edge of the entire band is not allocated, similar processing is naturally performed on opposite adjacent frequency channels to the frequency channel allocated to the limited band terminal.

The above-mentioned descriptions are of an example, and as described previously, when a further steeper filter is applied, the increment rate of power allocation is increased, while the number of subcarriers requiring support is decreased. Further, different cases are obtained also depending on the interval of subcarriers, difference in SNR required by a receiver, margin of SNR and the like. Further, there is a case that a limited band terminal does not need subcarriers at the edge of the band according to the required transmission amount of each terminal, and it is considered that the subcarriers are allocated to a full band terminal. This is determined in each system in designing the system.

Figure 9:
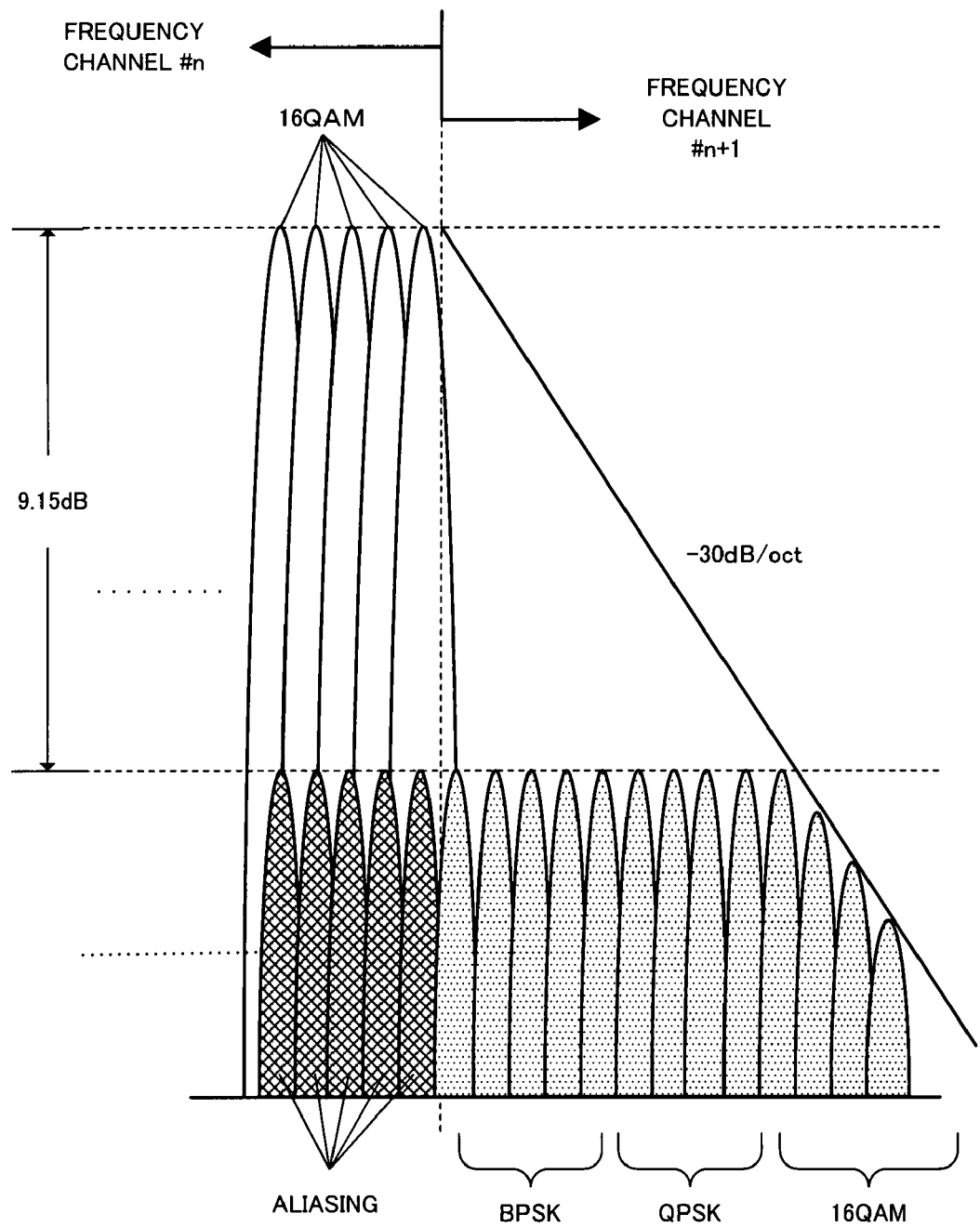
FIG. 9 is a diagram illustrating the relationship between subcarriers and transmit power.

By allocating the transmit power as shown in FIG. 8, the limited band terminal allocated frequency channel #n is capable of obtaining a reception signal as shown in FIG. 9. By this means, in this example, the SNR is obtained that enables 16QAM to be ensured in the band.

Second Embodiment

Figure 10:
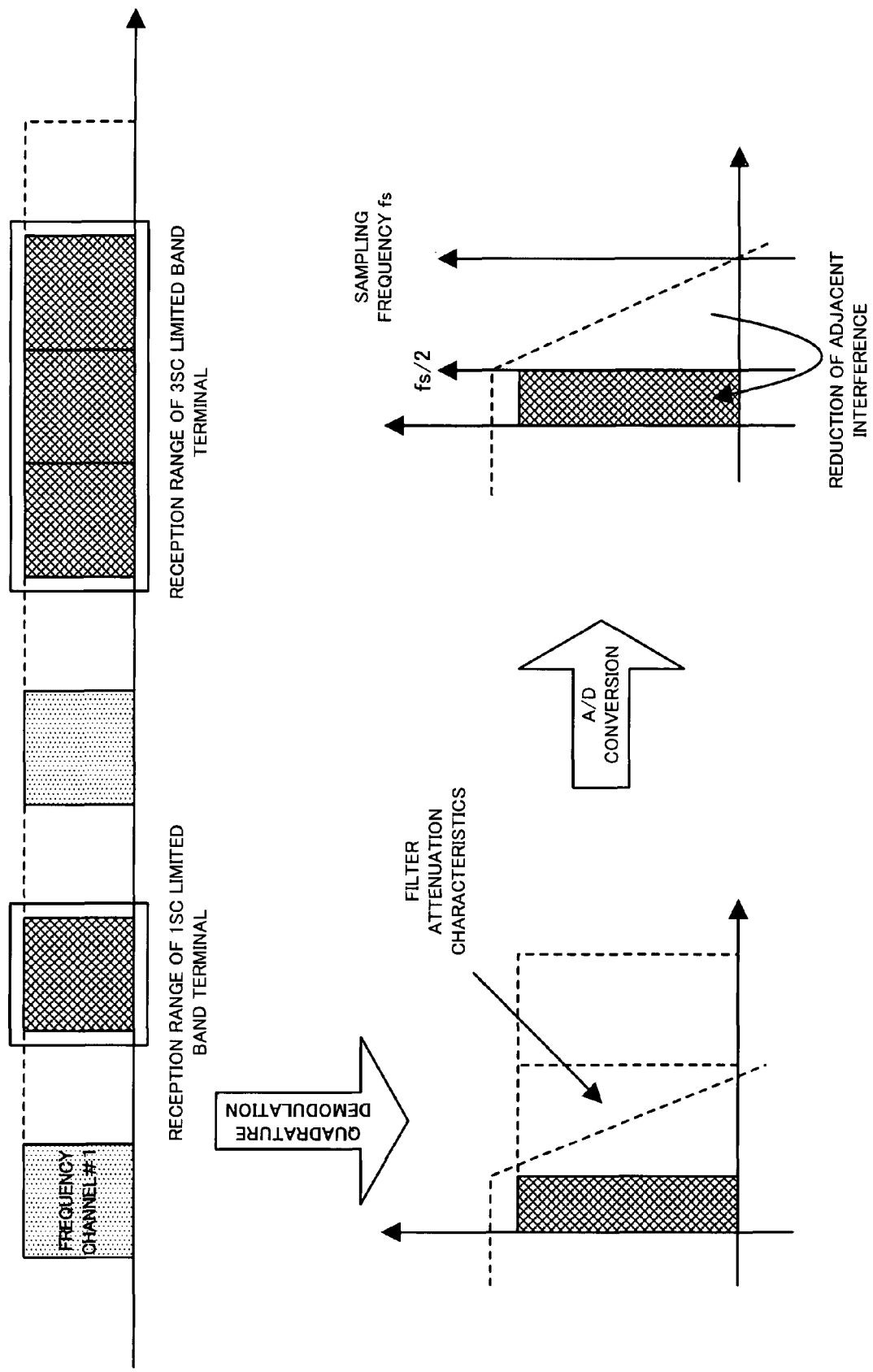
FIG. 10 is a diagram showing an example of a frequency channel arrangement on DL in an OFDMA communication system according to the second embodiment.

FIG. 10 is a diagram showing an example of a frequency channel arrangement on DL in an OFDMA communication system according to the second embodiment. The base station recognizes that the frequency channel allocation is for a frequency channel limited band terminal, and sets zero on levels of the transmit power of all the subcarriers of a frequency channel adjacent to the reception band of the terminal. In other words, subcarriers to handle are expanded to the entire frequency channel, and it is equivalent to not allocating the power. In this respect, the second embodiment differs from the first embodiment. In the first embodiment, another user is allocated to the adjacent frequency channel to perform the processing. In contrast thereto, in the second embodiment, any user is not allocated to the adjacent frequency channel from the beginning.

For example, in FIG. 10, the levels of the transmit power of all the subcarriers are set at zero in opposite adjacent frequency channels of the range enabling reception of the limited band terminal limited in the number of processable frequency channels to one frequency channel (1SC) Similarly, the levels of the transmit power of all the subcarriers are set at zero in opposite adjacent frequency channels of the range enabling reception of the limited band terminal limited in the number of processable frequency channels to three frequency channels (3SC). By this means, in performing A/D conversion, since the levels are zero in the transmit power of the subcarriers targeted for aliasing, the effect of aliasing is reduced.

Third Embodiment

Figure 11:
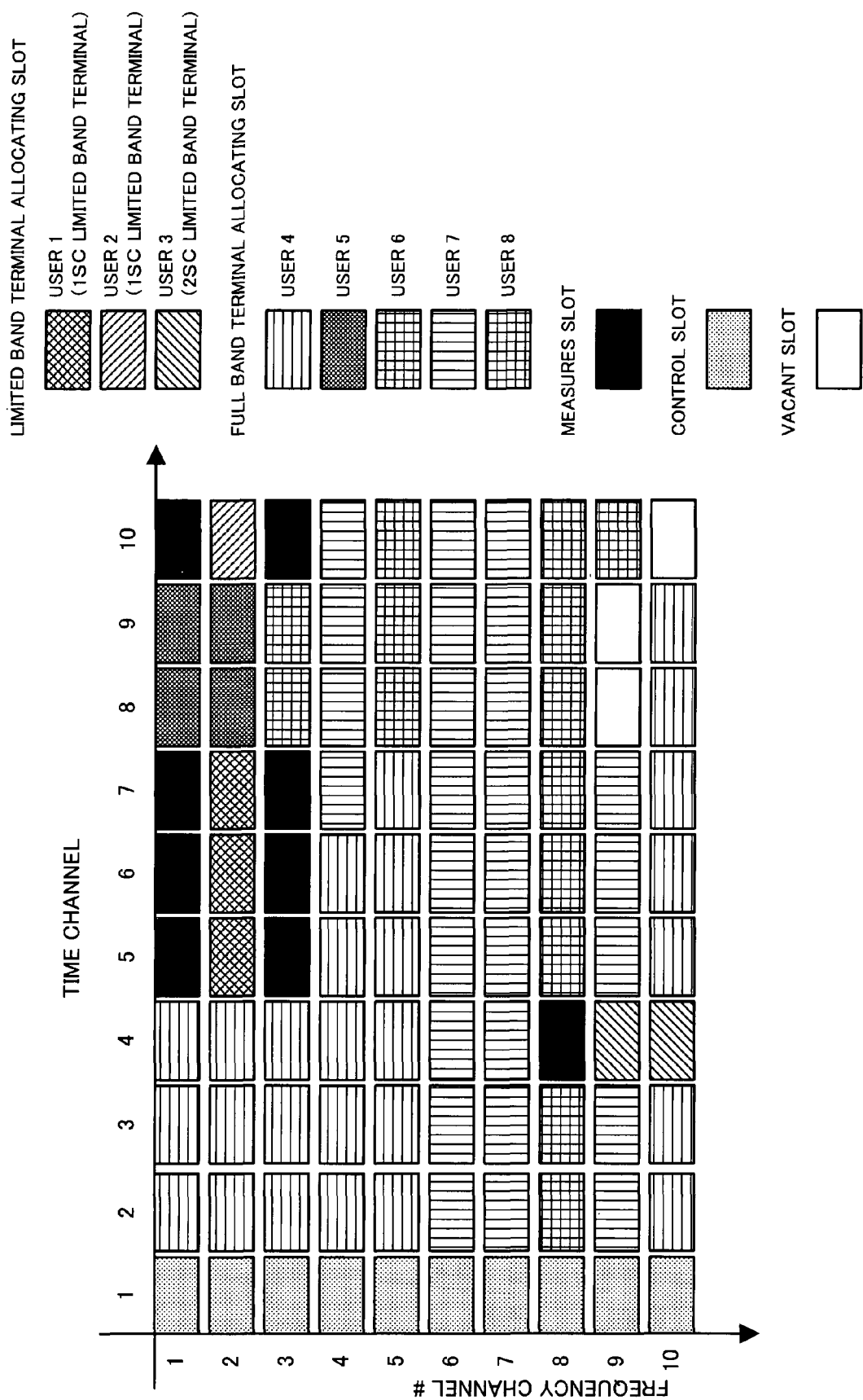
FIG. 11 is a diagram showing an example of a communication frame in an OFDMA communication system according to the third embodiment.

FIG. 11 is a diagram showing an example of a communication frame in an OFDMA communication system according to the third embodiment. The first and second embodiments basically describe the allocation on the frequency axis. However, in the allocation of frequency channel to each user, there is a method of regarding a period defined by a plurality of symbols each with a predetermined duration as a time channel, and performing the allocation on a basis of a unit called a communication frame comprised of a plurality of time channels and a plurality of frequency channels. In other words, the method is to allocate an optimal slot to each communicating apparatus among communication slots specified by time channels and frequency channels in a single frame, and subsequently, explanations are given including the case that the present invention is applied to such an allocation on a communication frame basis. In the following descriptions, the communication frame is formed of ten frequency channels as frequency channels, and ten time slots as time channels. Then, as the limited band terminal, allocations are made to two one-frequency channel limited band terminals, and one two-frequency channel limited band terminal. The fifth to seventh time slots of frequency channel #2 are allocated to a user of the one-frequency channel limited band terminal, and the tenth time slot is allocated to the other user. The base station notified of the limited band terminal from the terminal allocates communication slots as described in the first or second embodiment to time slots 5 to 7 and 10 in frequency channels #1 and #3.

In other words, in the first embodiment, the levels of transmit power allocated to an arbitrary number of subcarriers are decreased among subcarriers of communication slots adjacent in the frequency channel direction to the communication slot allocated to the limited band terminal. In the second embodiment, the levels of transmit power allocated to all the subcarriers are set at zero in communication slots adjacent in the frequency channel direction to the communication slot allocated to the limited band terminal. In FIG. 11, the communication slots as described in the first and second embodiments are called measures slots.

Similarly, time slots 4 of frequency channels #9 and #10 are allocated to a user of the two-frequency channel limited band terminal. At this point, since a guard band exists out of frequency channel #10 (opposite side to frequency channel #9 in the frequency channel direction), only frequency channel #8 is a measures slot. As in the first and second embodiments, by adaptively applying measures to adjacent slots, it is possible to enhance the spectral efficiency, and introduce the limited band terminal to the same system.

Fourth Embodiment

Figure 12:
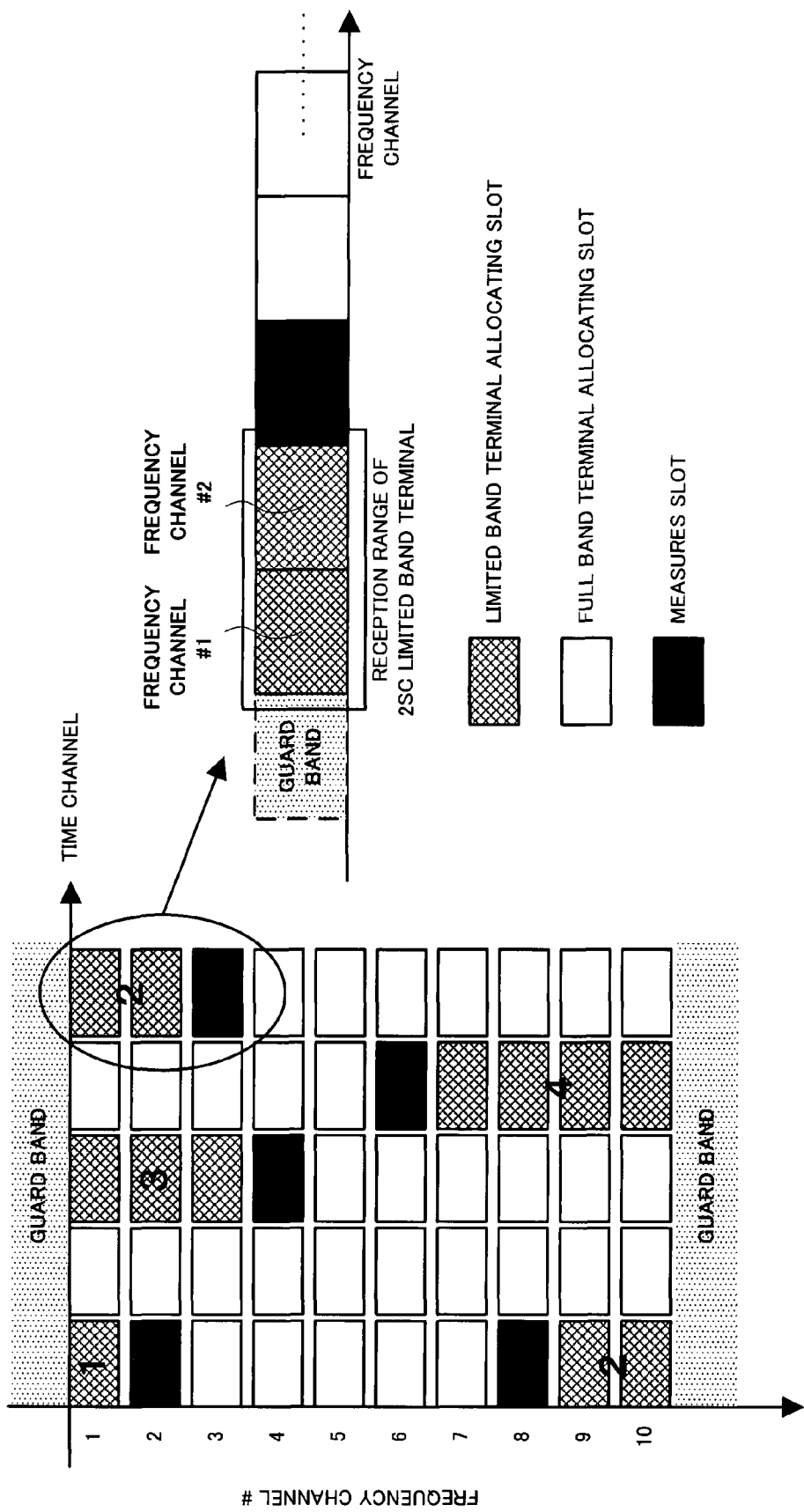
FIG. 12 is a diagram illustrating frequency channel allocations to terminals limited to n frequency channels according to the fourth embodiment.

FIG. 12 is a diagram illustrating frequency channel allocations to terminals limited to n frequency channels. Herein, frequency channels at opposite edges of the entire frequency band are preferentially allocated to the limited band terminals. In FIG. 12, channels are allocated starting with frequency channel #1 or #10. According to the fourth embodiment, frequency channels with the need of measures slots are of only one adjacent side, and slots can be used more effectively.

Fifth Embodiment

Figure 13:
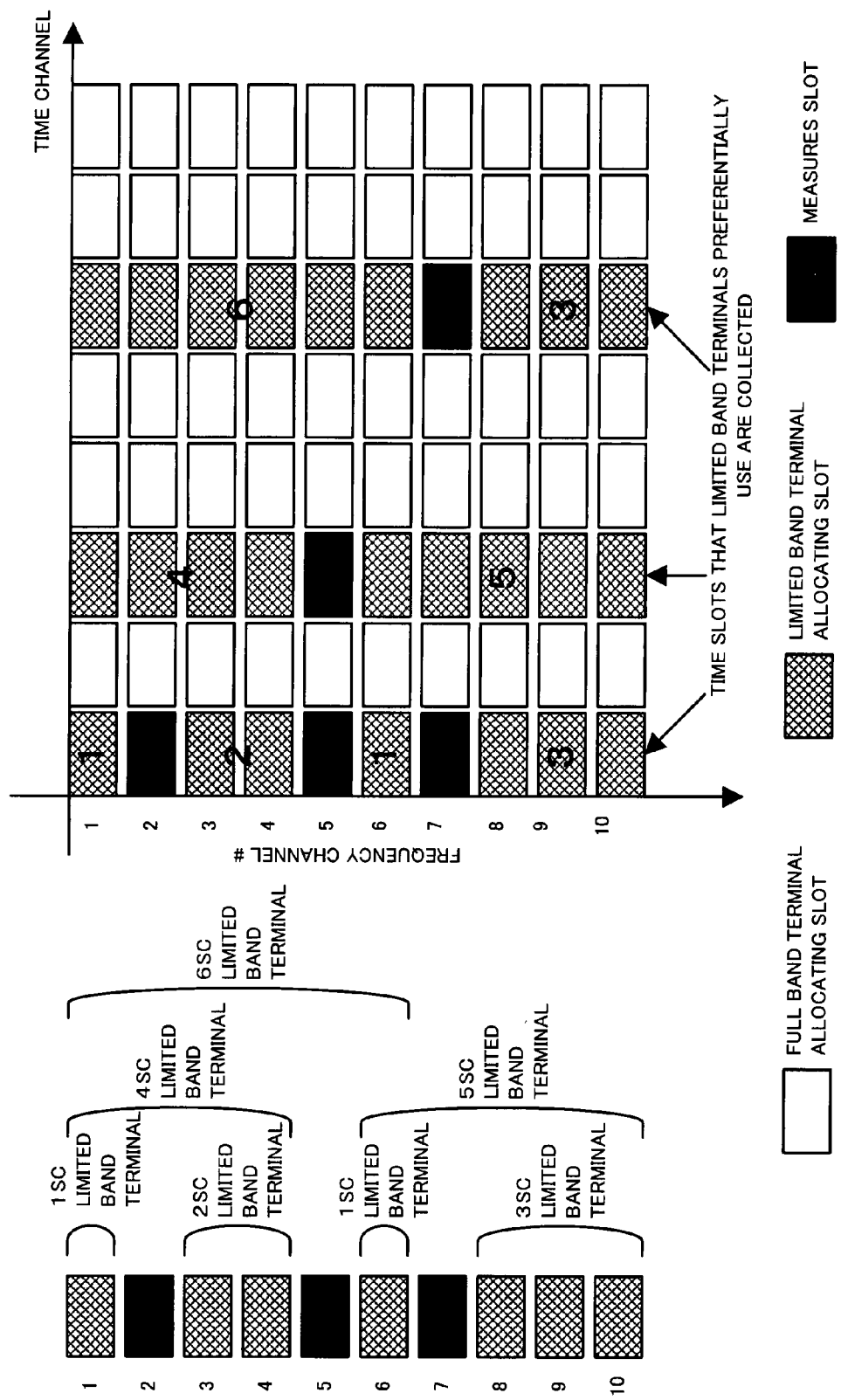
FIG. 13 is a diagram illustrating frequency channel allocations to limited band terminals according to the fifth embodiment.

FIG. 13 is a diagram illustrating frequency channel allocations to limited band terminals according to the fifth embodiment. In FIG. 13, as shown at the left side as viewed in the figure, a predetermined limited number of subcarriers are set for dedicated frequency channels. Further, limited band terminals are allocated to be adjacent to one another to use the same time slots as possible. By this means, the measures slots can be shared, and the use efficiency of communication slots is enhanced.

Generally, a control slot is provided at the beginning of a frame. This is because of the need of information such that what slot is allocated to which user for each frequency channel, and all the users need to be able to demodulate the control information corresponding to respective frequency channels. Since this data is modulated at a low modulation rate, it is considered that all the terminals are able to demodulate the data without particular problems even in environments that limited band terminals exist. However, by allocating as shown in FIG. 13, frequency channels with measures slots inserted therein can be fixed, and the power and the like of the control slot can be different from that of the measures slot.

Figure 14:
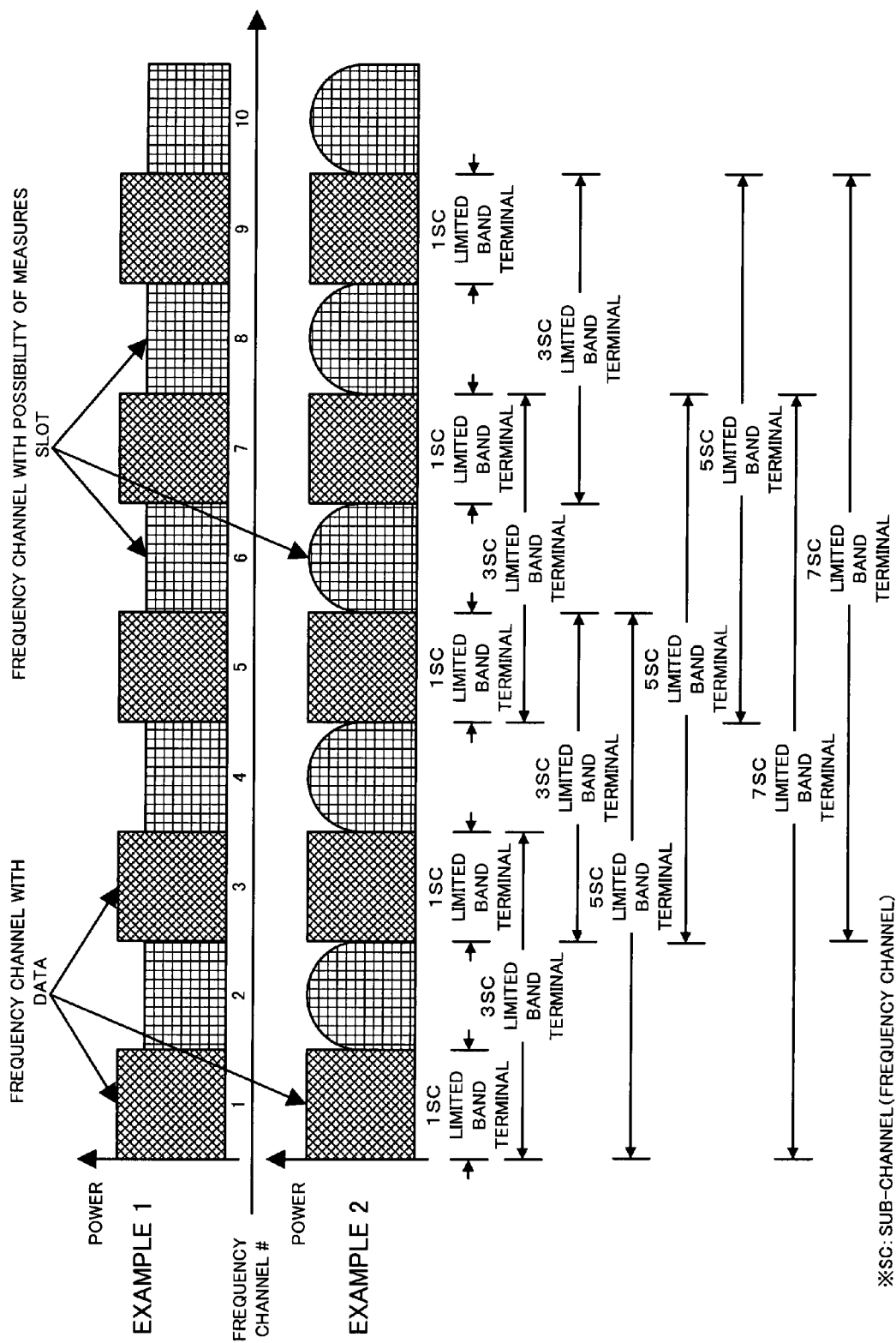
FIG. 14 is a diagram showing two types of specific examples of power control of control slots in the fifth embodiment.

FIG. 14 shows two types of specific examples of power control of the control slot. Herein, FIG. 14 differs from FIG. 13, and shows an example of a frame structure where slots for one-limited band terminals are arranged over the entire band i.e. a frame structure where a measures slot is inserted every other frequency channel. By arranging in such a manner, it is possible to support terminals limited to odd-numbered frequency channels 1, 3, 5 . . . . Although it is not possible to support even-number (2, 4, 6 . . . ) limited band terminals, it is possible to support terminals limited to a minimum one frequency channel, and the essence is not affected even when slots are skipped.

Thus, since the measures frequency channels (measures slots) are fixed, by decreasing the power in the measures frequency channel to a certain level, or decreasing the power toward opposite edges in the band, measures are taken for making the power of the measures slot relatively lower than the power near boundaries adjacent to adjacent frequency channels near the frequency channel boundaries. It is thereby possible to compensate for the effect of aliasing also in the control information of the limited band terminal, and further improve the demodulation capability. Moreover, as can be seen from FIG. 14, it is possible to arrange selection candidate frequency channels for limited band terminals over the entire band, and frequency channels with good reception states can be selected easier from the entire band. For the full band terminal, it is also considered that the terminal is not affected by low power due to the low modulation rate.

In FIG. 14, even-numbered frequency channels are measures frequency channels, and it is naturally considered that the odd number and the even number are switched at any timing. Further, when the number of all frequency channels is an odd number, it is possible to perform optimal allocations.

Figure 15:
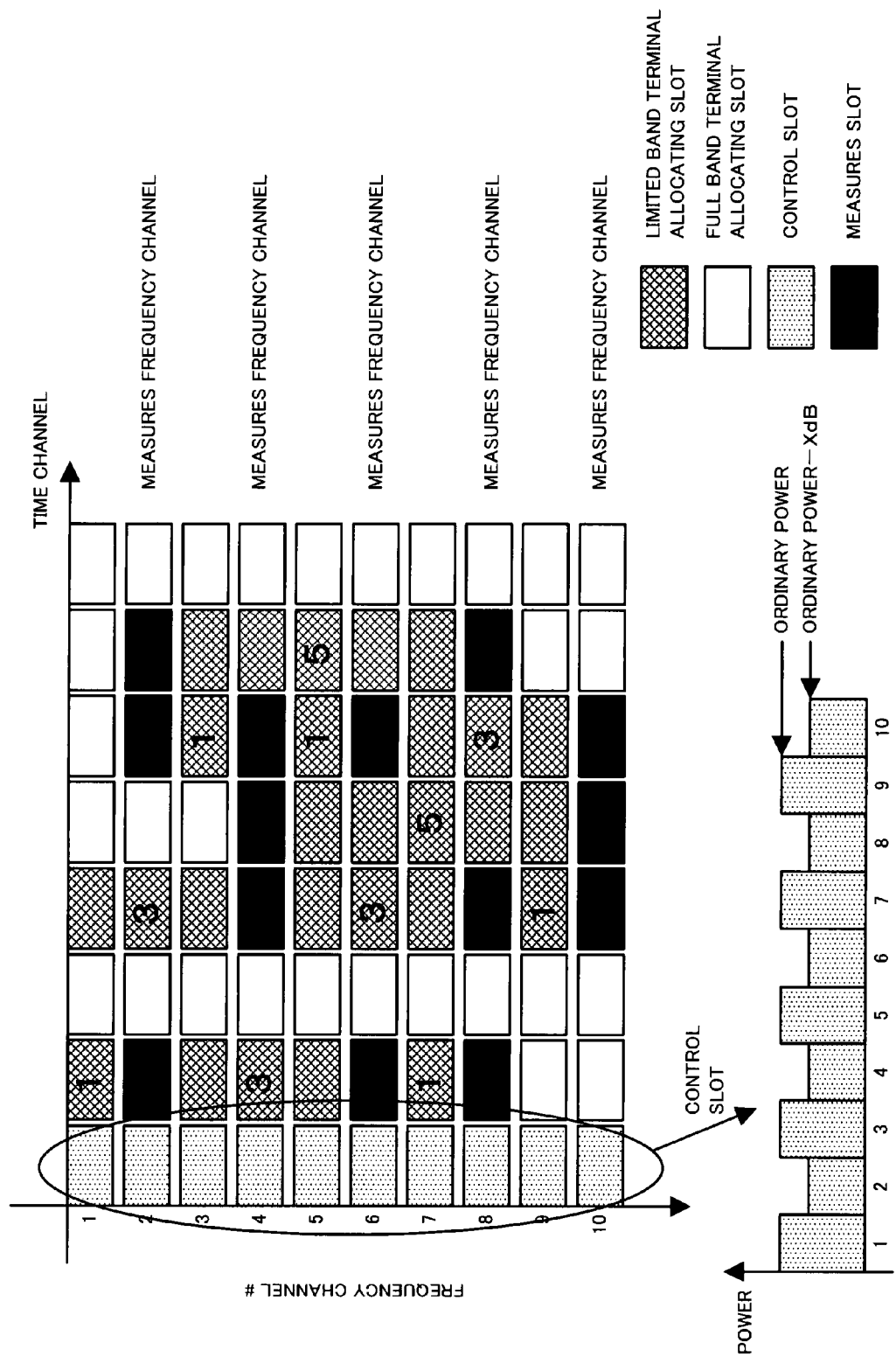
FIG. 15 is a diagram showing an example of power control of control slots and a terminal allocation method in the fifth embodiment.

FIG. 15 is a diagram showing an example of power control of control slots and a terminal allocation method. The allocation of frequency channels is the same as in FIG. 14. Accordingly, the power of the control channel is made high and low repeatedly every frequency channel. FIG. 15 shows allocations of one-limited, three-limited and five-limited band terminals in this frame. By performing power control of the control channel in this pattern, it is possible to send the control information on all the channels, and the limited band terminals can exist almost evenly over the entire band.

Sixth Embodiment

Figure 16:
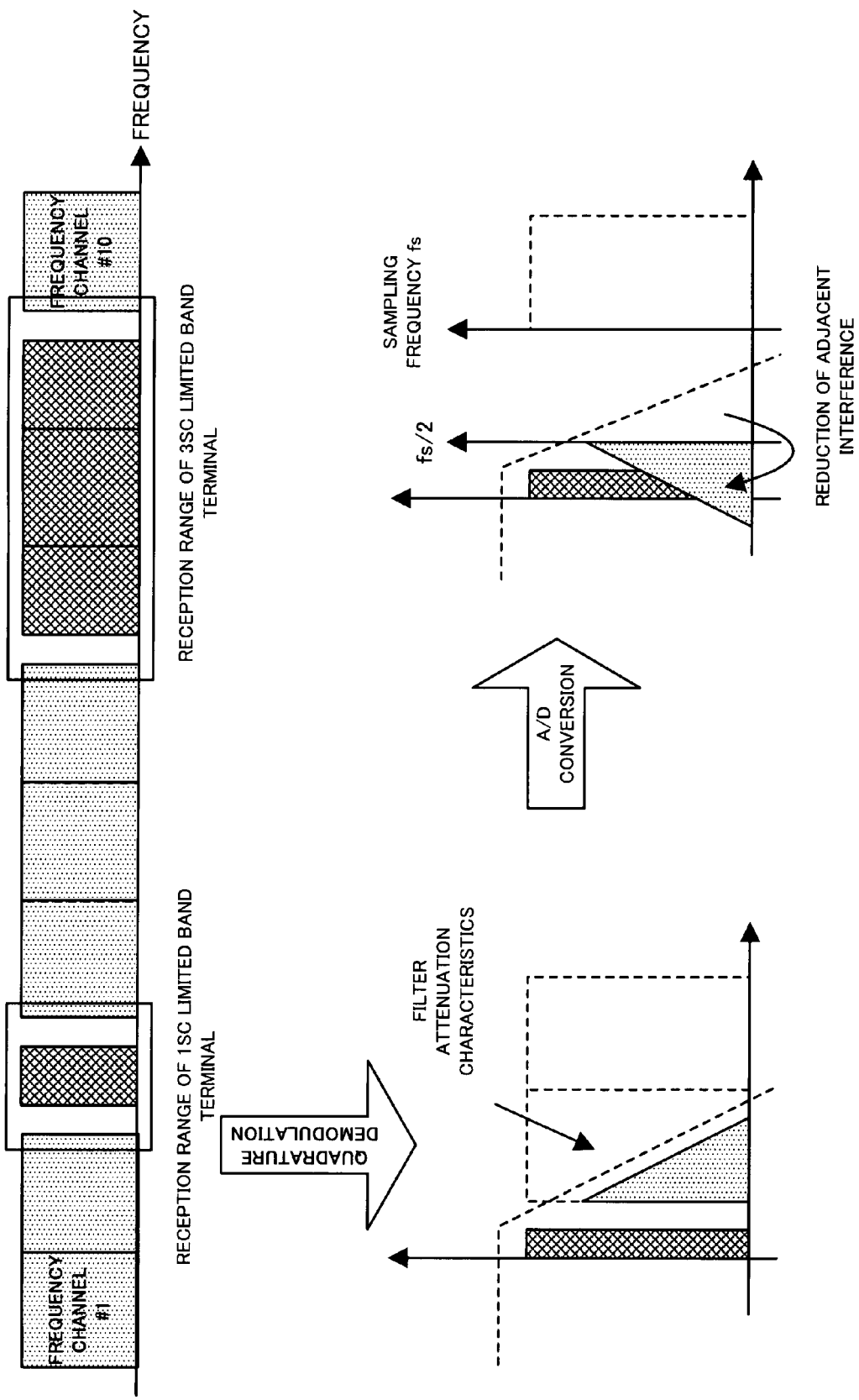
FIG. 16 is a diagram showing an example of a communication frame in an OFDMA communication system according to the sixth embodiment.

FIG. 16 is a diagram showing an example of a communication frame in an OFDMA communication system according to the sixth embodiment. In allocating a frequency channel adjacent to a frequency channel allocated to an n-limited band terminal to another terminal, the base station does not give the power to an arbitrary number of subcarriers inward from the opposite edges of the frequency range that the limited band terminal is capable of receiving. This is a scheme that the terminal notifies the base station of the information that the quality is poor in an arbitrary number of subcarriers, and that the power is thereby not allocated to the subcarriers under the initiative of the limited band terminal.

Figure 17:
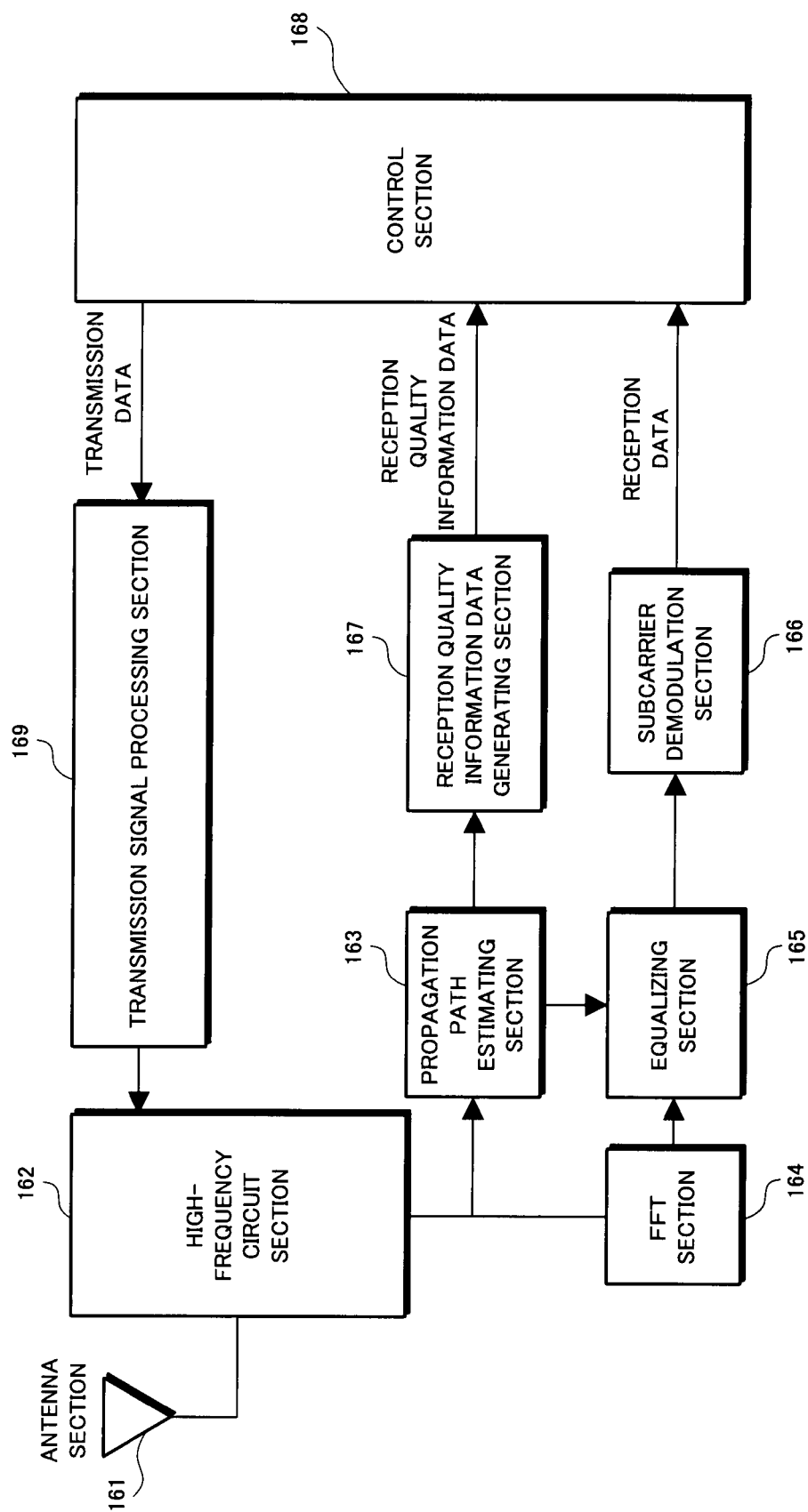
FIG. 17 is a block diagram illustrating a schematic configuration of a mobile terminal according to the sixth embodiment.

Such a terminal will be described with reference to FIG. 17. FIG. 17 is a block diagram illustrating a schematic configuration of a mobile terminal according to the six embodiment. A radio signal received in an antenna section 161 is converted from a high-frequency signal to a baseband signal in a high-frequency circuit section 162 and delivered to a propagation path estimating section 163 that estimates distortion on the propagation path and an FFT section 164 that performs FFT (Fast Fourier Transform). Next, an equalizing section 165 compensates a reception signal for deterioration due to delay distortion by multipath and the like based on the propagation path estimation result, and a subcarrier demodulation section 166 performs demodulation for each subcarrier.

Then, a terminal reception quality information data generating section 167 generates reception quality information based on the information from the propagation path estimating section 163. The data generated in the terminal reception quality information data generating section 167 is output as part of transmission data from a control section 168 to a transmission signal processing section 169, and via the high-frequency circuit section 162, and antenna section 161, transmitted to a communicating apparatus.

The mobile terminal as shown in FIG. 17 transmits to the base station a desired frequency channel and the information that lower b subcarriers and upper b subcarriers on the frequency channel are always poor in reception state. By this means, the base station does not need to consider allocations to adjacent frequency channels.

Figure 18:
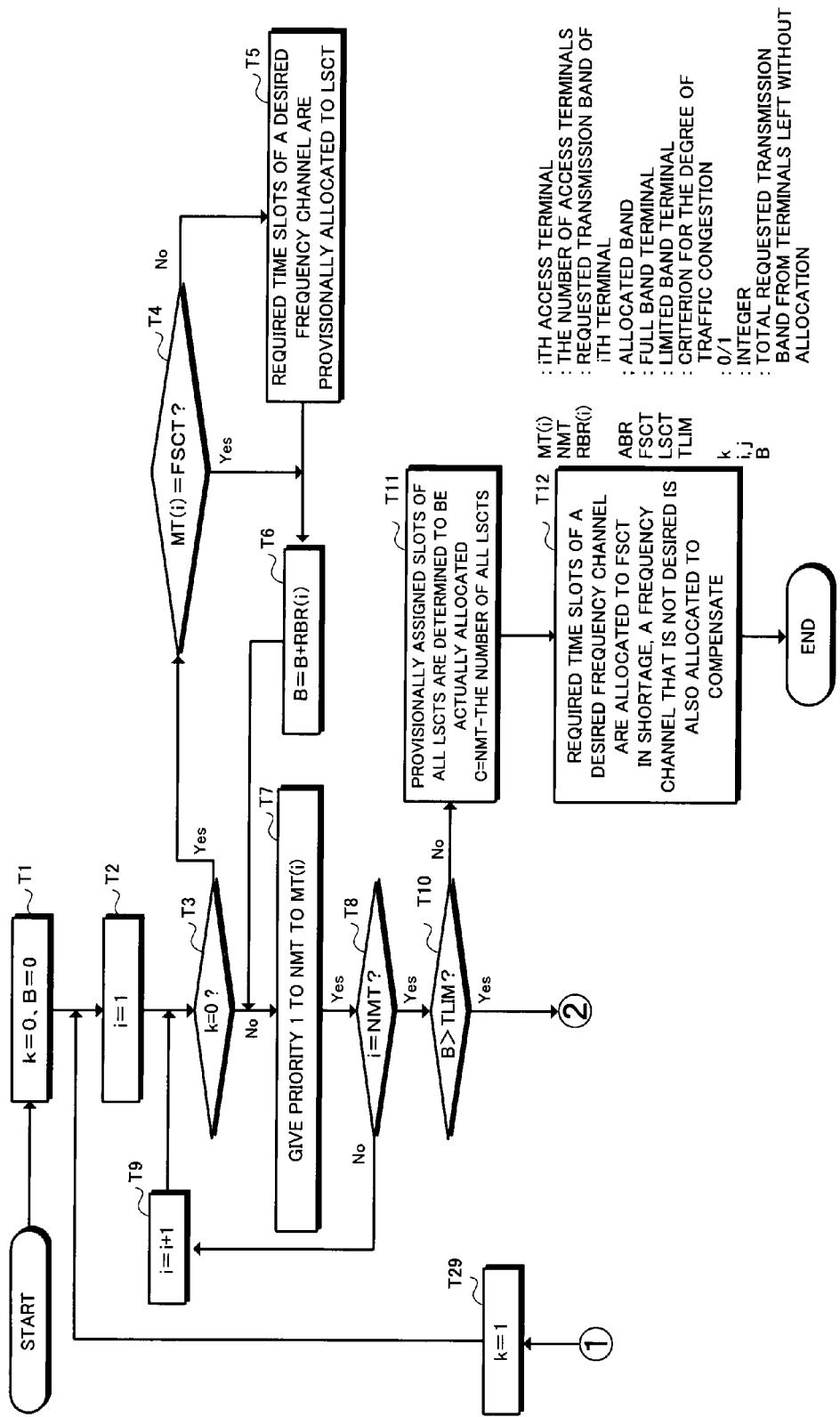
FIG. 18 is a flowchart illustrating the operation of a base station according to the sixth embodiment.
Figure 19:
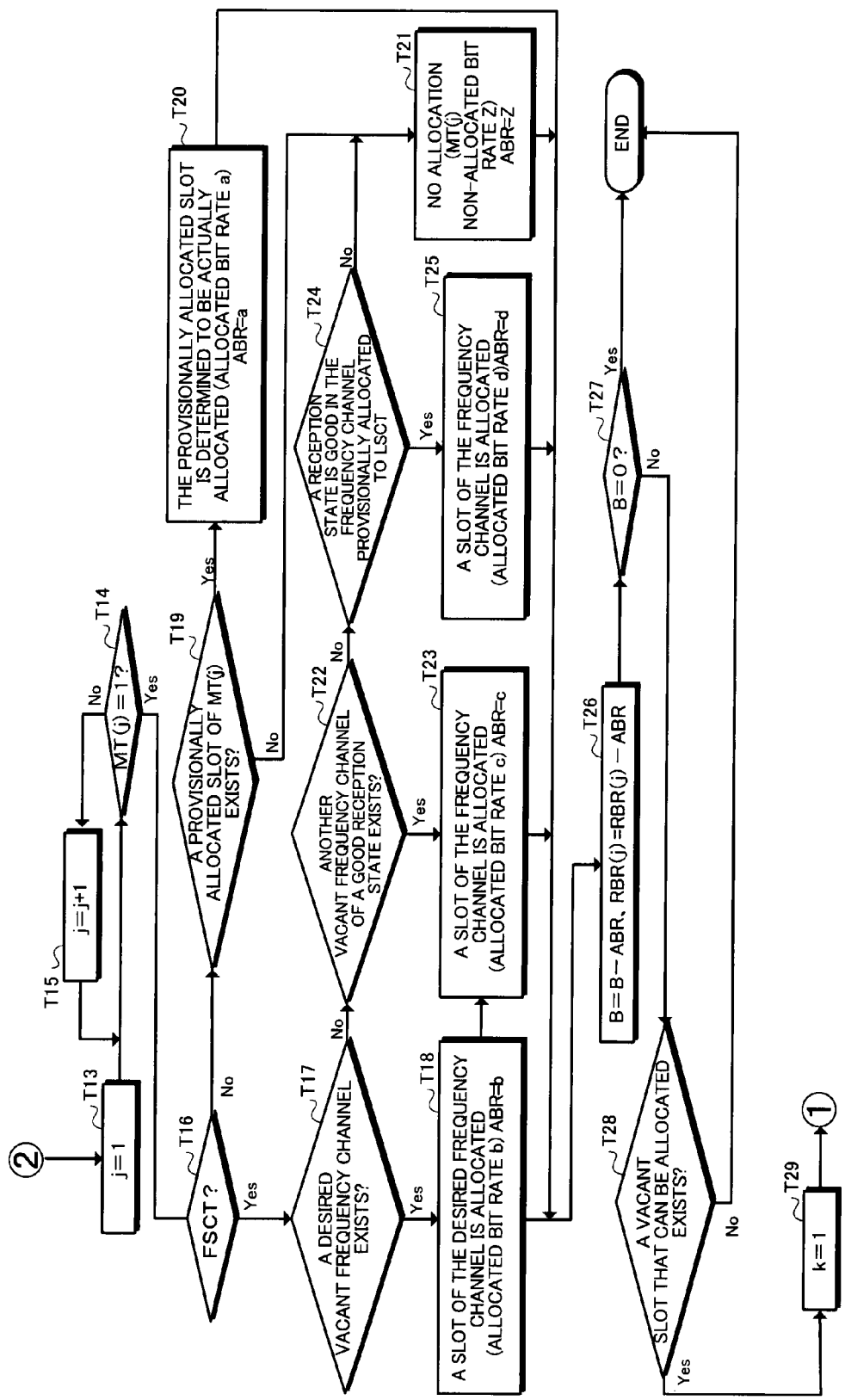
FIG. 19 is another flowchart illustrating the operation of the base station according to the sixth embodiment.

FIGS. 18 and 19 are flowcharts illustrating the operation of the base station according to the sixth embodiment. In the figures, "k" is "0" or "1", and immediately after starting the allocation, is only "0". Using k, required transmission bands are obtained for all the terminals, while provisional allocations are made to limited band terminals. "i" is an integer, the loop is circulated in the number of terminals, and priorities are determined. "j" is an integer, and used in searching for a terminal with the highest priority at this point. "B" indicates the total requested transmission band from terminals left without allocations.

First, in a first loop, a priority is determined for each terminal, while entire required bit rates are obtained. In other words, k=0 and B=0 is set (step T1), and i=1 is set (step T2). Next, it is determined whether k=0 holds (step T3), and when k=0 holds, it is determined whether MT(i)=FSCT (full band terminal) holds (step T4). When MT (i) is not FSCT i.e. is LSCT, required time slots of a desired frequency channel are provisionally allocated to the LSCT (limited band terminal) (step T5). In step T4, when MT(i)=FSCT holds, the flow proceeds to step T6.

Next, B=B+RBR(j) (requested transmission band of the ith terminal) is set, and MT(i) is given the first priority to NMT (the number of terminal in access). Next, it is determined whether i=NMT holds (step T8), and when i=NMT does not hold, i=i+1 is set (step T9) to shift to step T3. Meanwhile, when i=NMT holds in step T8, it is determined whether B>TLIM (criterion by which to judge a degree of traffic congestion) holds (step T10), and when B>TLIM does not hold, the provisionally allocated slots of all LSCTs are determined to be actually allocated (step T11). In other words, C is set at NMT−the number of all LSCTs. Then, required time slots of a desired frequency channel are allocated to FSCT, and in the case of shortage, a frequency channel that is not desired is also allocated to compensate (step T12). Then, the processing is finished.

Next, when B>TLIM holds in step T10, j=1 is set (step T13), and it is determined whether MT(j)=1 holds (step T14). When MT(j)=1 does not hold, j=j+1 is set (step T15), and the flow proceeds to step T14. Meanwhile, when MT(j)=1 holds in step T14, it is determined whether the terminal is FSCT (step T16). When the terminal is FSCT, it is determined whether a desired vacant frequency channel exists (step T17), and when the desired vacant frequency channel exists, a slot of the desired frequency channel is allocated (step T18). In other words, bit rate b obtained by this allocation is entered at one slot allocation ARB.

When the terminal is not FSCT in step T16, it is determined whether a provisionally allocated slot of MT(j) exists, and when the provisionally allocated slot of MT(j) exists, the provisionally allocated slot is determined to be actually allocated (step T20). Meanwhile, when any provisionally allocated slot does not exist in step T19, no allocation is determined (step T21). In other words, bit rate z obtained by this allocation is entered at one slot allocation ARB.

When any desired vacant frequency channel does not exist in step T17, it is determined whether another vacant frequency channel of a good reception state exists (step T22). When another vacant frequency channel of a good reception state exists, a slot of the frequency channel is allocated (step T23). In other words, bit rate c obtained by this allocation is entered at one slot allocation ARB.

When another vacant frequency channel of a good reception state does not exist in step T22, it is determined whether a reception state is good in the frequency channel provisionally allocated to the LSCT (step T24). When the reception state is good in the frequency channel provisionally allocated to the LSCT, a slot of the frequency channel is allocated (step T25). In other words, bit rate d obtained by this allocation is entered at one slot allocation ARB.

Next, B=B−ARB and RBR(j)=RBR(j)−ARB are set (step T26), and it is determined whether B=0 holds (step T27). When B=0 does not hold, it is determined whether a vacant slot that can be allocated exists (step T28), and when the vacant slot that can be allocated exists, k=1 is set (step T29), while shifting to step T2. Meanwhile, when B=0 holds in step T27, or when any vacant slot that can be allocated does not exist in step T28, the processing is finished.

Seventh Embodiment

Figure 20:
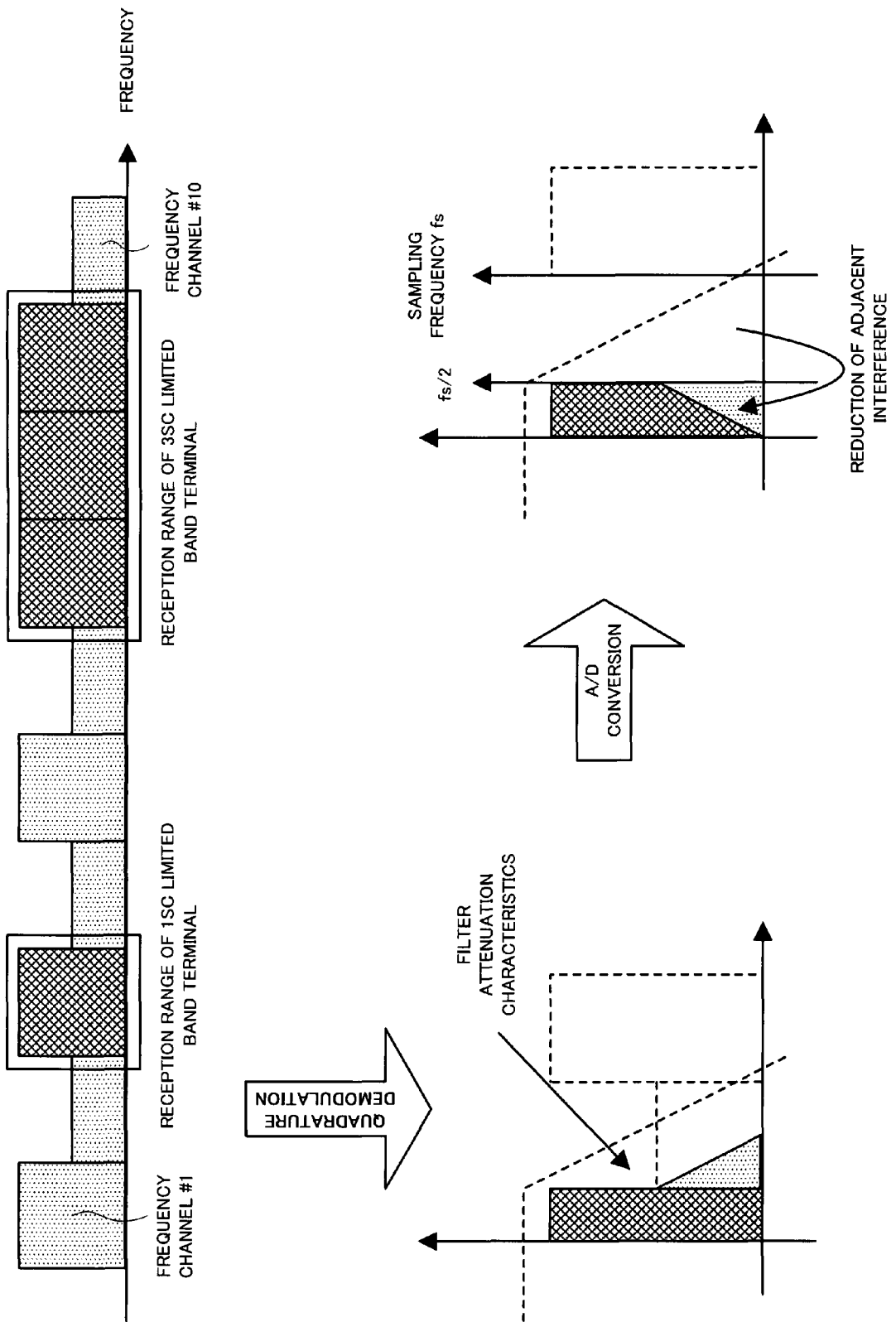
FIG. 20 is a diagram showing an example of a communication frame in an OFDMA communication system according to the seventh embodiment.

FIG. 20 is a diagram showing an example of a communication frame in an OFDMA communication system according to the seventh embodiment. In the seventh embodiment, the base station detects the reception power for each terminal. Then, in allocating another terminal to an adjacent channel of the frequency channel allocated to a limited band terminal, the base station allocates a terminal with high reception power because the terminal exists closer to the base station and the like. Then, the transmit power of the slot is set to be lower than the power of the frequency channel allocated to the limited band terminal. It is possible to use such control of transmit power together with each of the above-mentioned embodiments.

Eighth Embodiment

Figure 21:
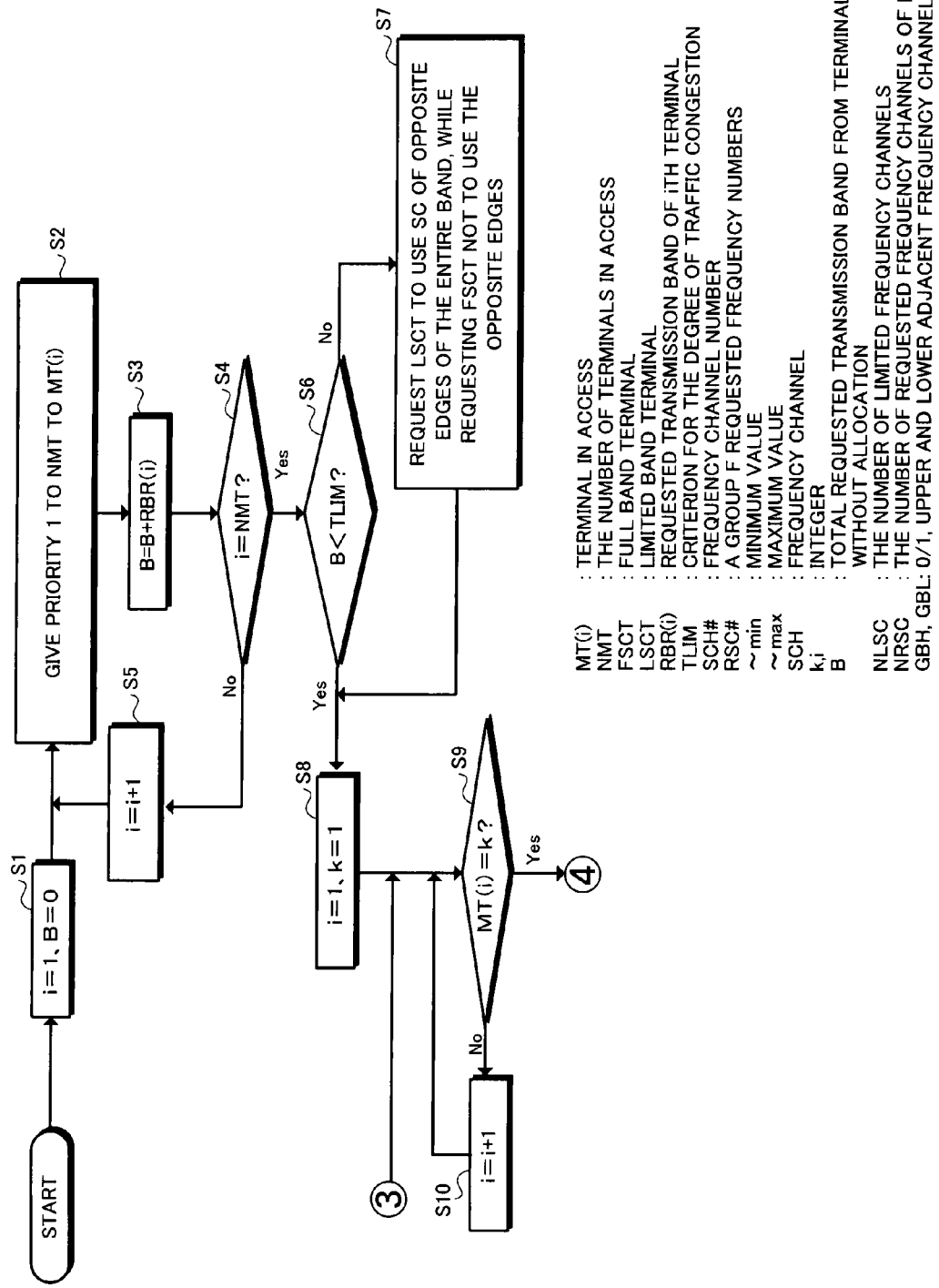
FIG. 21 is a flowchart illustrating the operation of a base station according to the eighth embodiment.
Figure 22:
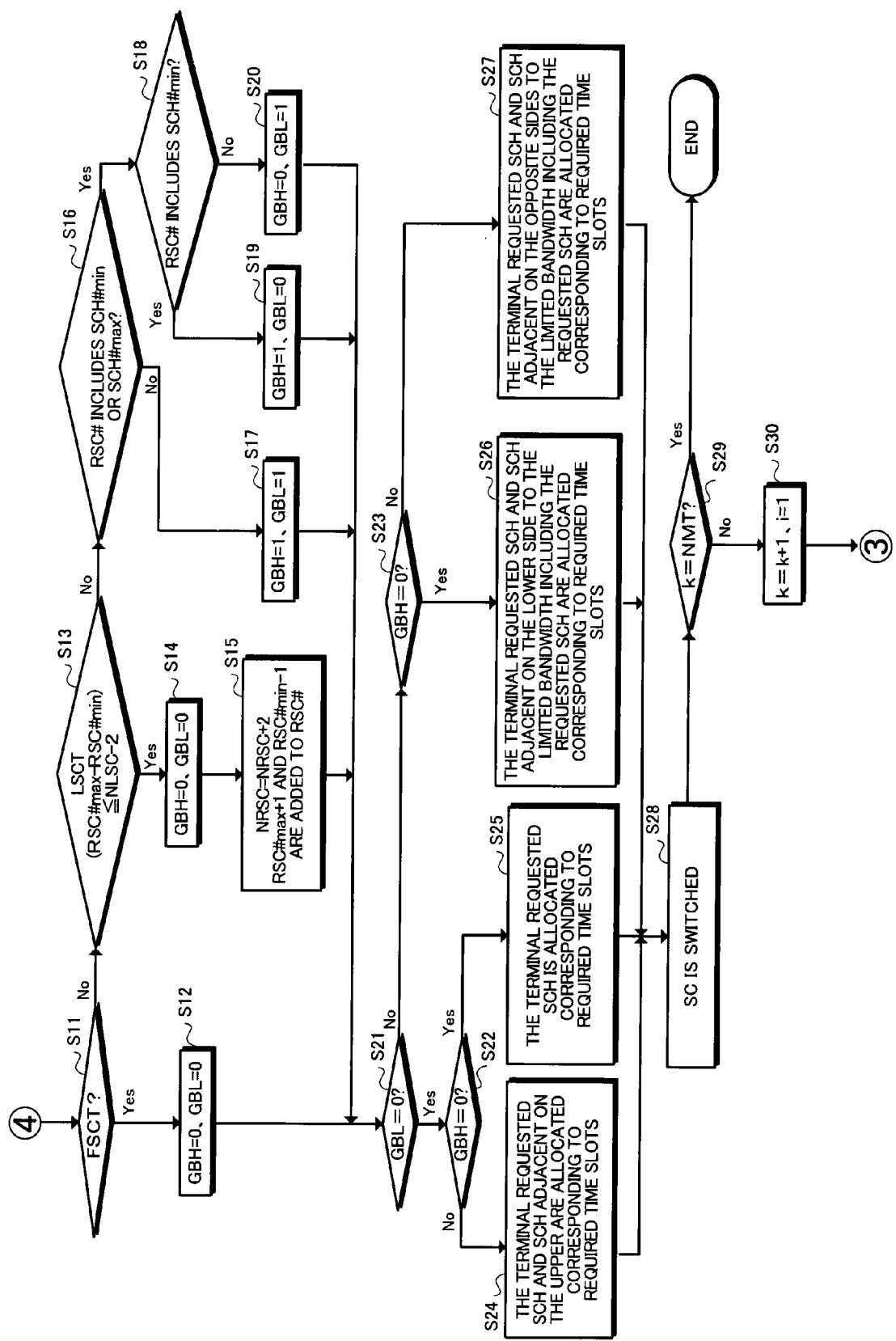
FIG. 22 is another flowchart illustrating the operation of the base station according to the eighth embodiment.

It is a feature of the eighth embodiment to have functions of the first, second and seventh embodiments. FIGS. 21 and 22 are flowcharts illustrating the operation of the base station according to the eighth embodiment. In the figures, "k" is to increment a priority to handle for each loop. "i" is an integer and used in a loop to determine a priority of a terminal and handle in the order of priority. "B" indicates the total requested transmission band from terminals left without allocations. "NLSC" indicates the number of limited frequency channels of a limited band terminal. "NRSC" indicates the number of frequency channels that each terminal requests. "GBH" is "0" or "1", and represents implementing measures for an upper (higher frequency) adjacent frequency channel when "1", while representing no need of such measures when "0". "GBL" is "0" or "1", and represents implementing measures for a lower (lower frequency) adjacent frequency channel when "1", while representing no need of such measures when "0". In addition, "k" and "i" in FIGS. 21 and 22 are used in different meaning from that of "k" and "i" in FIGS. 18 and 19.

As shown in FIGS. 21 and 22, first, a priority for each terminal is determined in a first loop, while entire required bit rates are obtained. In other words, terminal symbol i=1 and the terminal requested transmission band B=0 are set (step S1), and priority 1 to NMT (the number of terminals in access) is given to terminal MT(i) in access (step S2). Next, B=B+RBR(i) (requested transmission band of the ith terminal) is calculated (step S3), and it is determined whether i=NMT holds (step S4). When i=NMT does not hold, i=i+1 is set (step S5), and the flow shifts to step S2.

Meanwhile, when i=NMT holds in step S4, it is determined whether B<TLIM (criterion by which to judge a degree of traffic congestion) holds (step S6). When B<TLIM does not hold, in other words, when the traffic is congested, it is notified that frequency channels at opposite edges of the entire band are allocated to limited band terminals, and that frequency channels inward of the band are allocated to full band terminals (step S7). When this notification is not transmitted, each terminal uses a frequency channel of a good reception condition.

Next, i=1 and k=1 are set (step S8), and it is determined whether MT(i)=k holds (step S9). When MT(i)=k does not hold, i=i+1 is set (step S10), and the flow shifts to step S9. Meanwhile, when MT(i)=k holds, it is determined whether the terminal is FSCT (full band terminal) (step S11), and when the terminal is FSCT, GBH and GBL are set at zero (step S12).

Meanwhile, in step S11, when the terminal is not FSCT i.e. is LSCT (limited band terminal), in the case that an interval between the maximum and minimum requested channels is narrower than a number of limited channels by two frequency channels or more, the need is eliminated of providing measures frequency channels out of the band by setting an allocation not to allocate opposite sides of the limited band, and GBH and GBL are also zero. In other words, it is determined whether (RSC#max−RSC#min)≦(NLSC−2) holds (step S13), and when (RSC#max−RSC#min)≦(NLSC−2) holds, GBH=0 and GBL=0 are set (step S14), and NRSC=NRSC+2 is set, while RSC#max+1 and RSC#min−1 are added to RSC# (step S15).

Further, when an interval between the maximum and minimum requested channels is one frequency channel, and the requested frequency channel does not include an edge of the entire band, it is necessary to provide measures frequency channels at opposite sides, and GBH and GBL are set both at "1". In other words, when (RSC#max−RSC#min)≦(NLSC−2) does not hold in step S13, it is determined whether RSC# includes SCH#min or SCH#max (step S16), and when RSC# includes neither SCH#min nor SCH#max, GBH=1 and GBL=1 are set (step S17).

Meanwhile, when RSC# includes SCH#min or SCH#max in step S16, it is determined whether RSC# includes SCH#min (step S19). When RSC# includes SCH#min, GBH=1 and GBL=0 are set (step S19). When RSC# does not include SCH#min, GBH=0 and GBL=1 are set (step S20).

Then, time slots are allocated so that the terminal secures requested frequency channels up to a required bit rate. In other words, it is determined whether GBL=0 holds (step S21), and when GBL=0 holds, it is determined GBH=0 holds (step S22). When GBH=0 does not hold, the terminal requested SCH (frequency channel) and SCH adjacent on the upper side to the limited bandwidth including the requested SCH are allocated corresponding to required time slots (step S24) Meanwhile, when GBH=0 holds in step S22, the terminal requested SCH is allocated corresponding to required time slots (step S25).

When GBL=0 does not hold in step S21, it is determined whether GBH=0 holds (step S23). When GBH=0 holds, the terminal requested SCH (frequency channel) and SCH adjacent on the lower side to the limited bandwidth including the requested SCH are allocated corresponding to required time slots (step S26). Meanwhile, when GBH=0 does not hold in step S23, the terminal requested SCH and SCH adjacent on the opposite sides to the limited bandwidth including the requested SCH are allocated corresponding to required time slots (step S27).

Next, when vacant slots are not present in the requested frequency channel, it is checked whether the full band terminal allocated the frequency channel can be allocated another frequency channel, and when a candidate exists, the frequency channels are switched (step S28). This series of operations is repeated corresponding to the number of terminals. In other words, it is determined whether k=NMT holds (step S29), and when k=NMT does not hold, k=k+1 and i=1 are set (step S30), while shifting to step S9. Meanwhile, when k=NMT holds in step S29, the processing is finished.

As described above, according to this embodiment, when a communicating apparatus is capable of using only a limited number of frequency channels in a communication frame, the levels of transmit power are decreased in all or part of subcarriers of a communication slot that is adjacent on the frequency channel side to a communication slot allocated to the communicating apparatus and that is not allocated to the communicating apparatus in a communication frame. Therefore, in the case of using a low sampling frequency for low power consumption in the communicating apparatus, it is also possible to reduce an effect of the adjacent communication slot in the frequency channel direction. It is thereby possible to implement wireless communication also with the communicating apparatus limited in the frequency band that the communicating apparatus is capable of collectively process.

The invention claimed is:

1. A transmission apparatus that transmits to one or more reception apparatuses an OFDM signal comprised of a plurality of subcarriers arranged in a plurality of frequency channels of a frequency band, the transmission apparatus comprising:
   a subcarrier power control section configured to control transmit power to the plurality of subcarriers, wherein
      the subcarrier power control section is configured to allocate a lower transmit power to a number of subcarriers at least one edge of at least one of the plurality of frequency channels than the transmit power allocated to other subcarriers constituting the at least one of the plurality of frequency channels, and
      the subcarrier power control section is configured to determine, for each of the plurality of frequency channels, the number of subcarriers to which the lower transmit power is allocated.

2. The transmission apparatus according to claim 1, further comprising a control section that acquires information regarding a bandwidth usable for receiving in the one or more reception apparatuses and controls one or more of the plurality of subcarriers to be allocated to the one or more reception apparatuses.

3. The transmission apparatus according to claim 2, wherein the subcarrier power control section is configured to operate in a frequency channel which the control section has allocated to the one or more reception apparatuses configured for receiving only one of the plurality of frequency channels to set the number of the subcarriers to which the lower transmit power is allocated to a number greater than that of the other frequency channels of the plurality of frequency channels.

4. The transmission apparatus according to claim 1, wherein the subcarrier power control section is configured to set the transmit power to be allocated to the number of subcarriers at the at least one edge of the at least one of the plurality of frequency channels to zero.

5. The transmission apparatus according to claim 4, further comprising a control section configured to acquire information regarding a bandwidth usable for receiving in the one or more reception apparatuses and further configured to control one or more of the plurality of subcarriers to be allocated to the one or more reception apparatuses.

6. The transmission apparatus according to claim 5, wherein the subcarrier power control section is configured to operate in a frequency channel which the control section has allocated to the one or more reception apparatuses configured for receiving only one of the plurality of frequency channels to set the number of the subcarriers to which the lower transmit power is allocated to a number greater than that of the other frequency channels of the plurality of frequency channels.

7. The transmission apparatus according to claim 1, wherein the plurality of frequency channels have a respective plurality of frequency bandwidths that are determined to be a plurality of values smaller than a first frequency bandwidth of the frequency band.

8. A transmission method that transmits to one or more reception apparatuses an OFDM signal comprised of a plurality of subcarriers arranged in a plurality of frequency channels of a frequency band, the transmission method comprising the steps of:

allocating transmit power, when controlling the transmit power to the plurality of subcarriers, such that a number of subcarriers at least one edge of at least one of the plurality of frequency channels is allocated a lower transmit power than the transmit power allocated to other subcarriers constituting the at least one of the plurality of frequency channels; and determining, for each of the plurality of frequency channels, the number of subcarriers to which the lower transmit power is allocated.

* * * * *